US010681560B1

(12) United States Patent
Sevindik et al.

(10) Patent No.: US 10,681,560 B1
(45) Date of Patent: Jun. 9, 2020

(54) METHODS AND APPARATUS FOR ALLOCATING SPECTRUM IN CITIZENS BROADBAND RADIO SERVICE NETWORKS

(71) Applicant: Charter Communications Operating, LLC, St. Louis, MO (US)

(72) Inventors: Volkan Sevindik, Parker, CO (US); Haider Syed, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/233,965

(22) Filed: Dec. 27, 2018

(51) Int. Cl.
*H04W 16/14* (2009.01)
*H04W 84/10* (2009.01)

(52) U.S. Cl.
CPC .......... *H04W 16/14* (2013.01); *H04W 84/105* (2013.01)

(58) Field of Classification Search
CPC ............................. H04W 16/14; H04W 84/105
USPC .......................................... 455/509, 517–521
See application file for complete search history.

(56) References Cited

U.S. PATENT DOCUMENTS

| 2006/0105773 | A1* | 5/2006 | Lin | H04W 74/02 |
| | | | | 455/452.1 |
| 2014/0080535 | A1* | 3/2014 | Gauvreau | H04W 16/14 |
| | | | | 455/513 |
| 2018/0014304 | A1* | 1/2018 | Khoshnevisan | H04W 24/08 |
| 2018/0035434 | A1* | 2/2018 | Thanayankizil | H04W 72/00 |
| 2018/0132111 | A1* | 5/2018 | Mueck | H04W 16/14 |
| 2019/0044614 | A1* | 2/2019 | Khoshnevisan | H04B 7/2646 |

* cited by examiner

*Primary Examiner* — Edward F Urban
*Assistant Examiner* — Angelica M Perez
(74) *Attorney, Agent, or Firm* — Straub & Straub; Stephen T. Straub; Michael P. Straub

(57) ABSTRACT

Methods, systems and apparatus for allocating frequency spectrum resources in a Citizens Broadband Radio Service network. An exemplary method embodiment includes the steps of: receiving, by a Spectrum Access System (SAS), a channel message from a Citizens Broadband Radio Service Device (CBSD); selecting, by the SAS, in response to the received channel allocation message, a first frequency spectrum channel from a plurality of available frequency spectrum channels based on a type of traffic the CBSD is carrying; assigning, by the SAS, the selected first frequency spectrum channel to the CBSD for use in wireless communications with user equipment devices; communicating, by the SAS, information identifying the assigned first frequency spectrum channel to the CBSD. When the determined type of traffic being carried by the CBSD is said uplink dominated traffic basing said first frequency spectrum channel selection on adjacent channel interference.

20 Claims, 16 Drawing Sheets

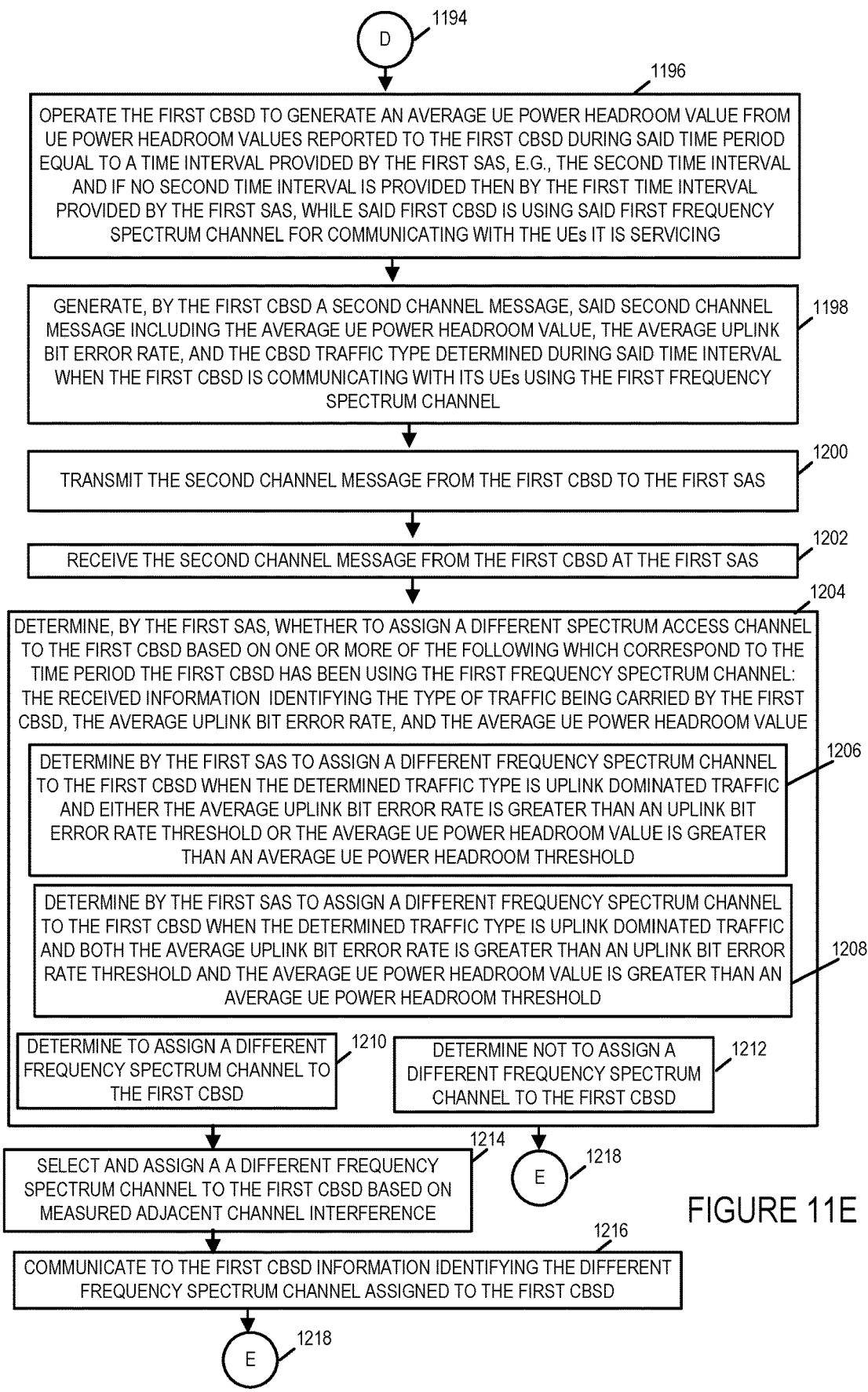

METHODS AND APPARATUS FOR ALLOCATING SPECTRUM IN CITIZENS BROADBAND RADIO SERVICE NETWORKS

FIELD OF INVENTION

The present invention relates to methods and apparatus for assigning spectrum to access points or base stations in a Citizens Broadband Radio Service (CBRS) network. More particularly, the present invention relates to methods and apparatus for allocating channels by a Spectrum Access System to an access point or base station, e.g., a Citizens Broadband Radio Service Device (CBSD), in a CBRS network based on co-channel interference and information pertaining to one or more of the following: adjacent channel interference, network traffic, user equipment power headroom, and uplink bit error rate information.

BACKGROUND OF THE INVENTION

In a Citizens Broadband Radio Service (CBRS) network. Citizens Broadband Radio Service Devices (CBSDs) serve as access points or base stations which can support wireless communications with user equipment devices (UEs).

A CBRS network often includes one or more Citizens Broadband Radio Service Devices (CBSDs) with relatively small coverage areas as compared to a macro base station or access point. The CBSDs are used to provide services to subscribers' user equipment devices. Spectrum is granted to each of the CBSDs using a centralized system called the Spectrum Access System (SAS). The Spectrum Access System is a central processing and database system that receives and processes spectrum grant requests. In the CBRS network, interference is managed through power management of CBSD devices by the Spectrum Access System (SAS). The SAS stores information regarding which CBSD uses how much spectrum at which location in the CBRS network. The objective of the SAS is to allocate spectrum in the most efficient and effective manner as possible. As the CBRS' network frequency spectrum is a limited resource, the SAS divides up the frequency spectrum into spectrum bands, e.g., frequency bands, which are assigned to different CBSDs. Each CBSD having its own cell area or coverage area in which it transmits. However, because the available frequency spectrum is limited the SAS reuses the same frequency spectrum, i.e., SAS assigns the same frequency spectrum also referred to as a channel to multiple CBSDs which are located in different cells. This reuse of the same transmission channels or frequency spectrum by multiple CBSDs gives rise to co-channel interference. Co-channel interference occurs when multiple wireless transmissions occur on the same channel in the same area. For example, a first user equipment device communicates in a first cell transmits a first signal to a first CBSD using a first channel or frequency but signals at the same frequency (co-channel signals) from transmitters in other cells communicating with different CBSDs also enter the first cell and interfere with the first signal. The first CBSD receives not only the first signal but also the unwanted co-channel signals resulting in problems in receiver performance. In addition to co-channel interference which occurs when the same channels or frequency spectrum are assigned to multiple CBSDs there is also an out of band or channel emission issue which is known as a signal leakage out of the frequency band or spectrum of operation. This emission is called adjacent channel interference and occurs when transmissions are sent on an adjacent channel, i.e., frequency, to the channel on which the CBSD is operating. While adjacent channel interference is a problem for both downlink and uplink wireless transmission, adjacent channel interference impacts uplink transmission from user equipment devices to CBSDs more than it does downlink wireless transmissions from CBSDs to user equipment devices since the transmission power for uplink transmissions is limited by the user equipment's maximum transmission power.

While the Spectrum Access Systems in CBRS networks currently assign or allocate frequency spectrum based on the co-channel interference level which each CBSD experiences at a particular geographical location, Spectrum Access Systems fail to take into account adjacent channel interference. That is Spectrum Access Systems attempt to optimize the assignment or allocations of frequency spectrum by assigning frequency spectrum or channels to the CBSDs so as to minimize the co-channel interference but do not take adjacent channel interference into account. By not taking adjacent channel interference into account when assigning or allocating frequency spectrum or channels to CBSDs, the Spectrum Access Systems are not making the most effective and efficient use of the limited frequency spectrum available in the CBRS network.

There is currently a technological problem in how to efficiently allocate resources, e.g., frequency spectrum, i.e., channel allocations, that efficiently and effectively utilize the limited frequency spectrum available to the CBRS network. There is also a current technological problem of how to take into account CBSD's traffic type in efficiently allocating frequency spectrum to CBSDs in CBRS networks to make efficient use of the limited frequency spectrum available. There is also a further need for new and/or improved methods and apparatus of allocating frequency spectrum in CBRS networks wherein the frequency spectrum is allocated based on feedback provided by CBSDs to the Spectrum Access System assigning spectrum to the CBSD. There is also a further technological problem of how to efficiently and effectively allocate frequency spectrum to CBSDs that account for adjacent channel interference being experienced by the CBSDs in addition to co-channel interference. One of the important objectives of the FCC is to utilize the available frequency spectrum in the CBRS network as efficiently and effectively as possible.

From the above it should be understood that there is a need for new and/or improved methods and apparatus for more efficiently assigning or allocating frequency spectrum or channels to CBSDs so as to reduce electromagnetic interference while optimizing CBSD devices coverage area and the quality of service for the user equipment devices being serviced by the CBSDs.

SUMMARY OF THE INVENTION

The present invention relates to methods, apparatus and systems for allocating frequency spectrum or channels to CBSDs, to reduce electromagnetic interference while optimizing CBSD devices coverage and the quality of service the CBSDs can provide to user equipment devices and making more efficient use of the limited frequency spectrum available in a CBRS network. Various embodiments of the present invention solve one or more of the problems discussed above.

Power headroom is a term used to describe information about how much, if any, transmission power increase is possible at a wireless terminal. The power headroom for terminals closer to a base station, e.g., CBSD device in a CBRS network, is normally greater than wireless terminals further from a base station since it is normally possible for a nearby terminal to communicate successfully with a base station using a lower transmission power than the wireless terminal's maximum transmission power. In some systems, wireless terminals report power headroom information to the base station with which it is communicating.

Bit error rate is the number of bit errors per unit time. Uplink bit error rate is measured by the CBSD with the bit errors being bit errors in the uplink communications from UE devices to the CBSD over the wireless communications channel assigned to the CBSD for communications with the UEs.

Various embodiments of the present invention utilize the type of traffic a CBSD is carrying and/or user equipment device power headroom information corresponding to user equipment devices in communication with a CBSD and/or uplink bit error rates measured/determined by a CBSD to determine whether to update a frequency channel assignment to a CBSD and/or the method of selecting a frequency channel assignment, e.g., determining type of interference to consider during selecting of the frequency channel assignment, e.g., adjacent channel interference and/or co-channel interference.

By using one or more of the techniques described herein a Spectrum Access System can take into account the type of traffic a CBSD is carrying when making frequency spectrum assignments which unlike previous known methods provides for more efficient management and usage of the Citizens Broadband Radio Service (CBRS) network's spectrum an important objective of the United States Federal Communications Commission (FCC). More efficient management and usage of the CBRS network spectrum including more efficient allocations of resources, e.g., frequency bandwidth allocations and/or power transmission allocations, based on an understanding of how the allocated spectrum is to be used and the type of interference which most affects the usages results in, among other things, improved Quality of Service for user equipment devices while also minimizing electromagnetic interference in the CBRS network.

In an exemplary method of allocating frequency spectrum resources in a Citizens Broadband Radio Service (CBRS) network in accordance with the present invention includes the steps of: receiving, by a first Spectrum Access System (SAS), a first channel message from a first Citizens Broadband Radio Service Device (CBSD); selecting, by the first Spectrum Access System, in response to the received first channel message a first frequency spectrum channel from a plurality of available frequency spectrum channels based on a type of traffic the first Citizens Broadband Radio Service Device is carrying; assigning, by the first Spectrum Access System, the selected first frequency spectrum channel to the first CBSD for use in wireless communications with user equipment devices; communicating, by the first Spectrum Access System, information identifying the assigned first frequency spectrum channel to the first CBSD. The first channel message includes one or more of the following: a frequency spectrum channel allocation request, such as a request for an updated frequency spectrum channel assignment, information indicating the type of traffic the first CBSD is carrying, an UE average power headroom value and an average uplink bit error rate. The first CBSD using the same frequency spectrum channel for both uplink and downlink traffic communications with the UE devices it is supporting. In some embodiments, the information identifying the assigned first frequency spectrum channel is a channel identifier. In some such embodiments, the channel identifier is a numerical value. The assignment of an available frequency spectrum channel to a CBSD in some embodiments changing the status of the assigned frequency spectrum channel to unavailable resulting in its removal from the plurality of available frequency spectrum channels. In some embodiments, the availability of a frequency spectrum channel for assignment to a CBSD depends on the geographical location of the CBSD. The type of traffic the first CBSD is carrying is typically one of the following traffic types: downlink dominated traffic type, uplink dominated traffic type, and balanced downlink and uplink traffic type.

In some embodiments, prior to selecting the first frequency spectrum channel the first SAS determines the type of traffic the first CBSD is carrying based on information provided by the first CBSD to the first Spectrum Access System; and when the determined type of traffic being carried by the first CBSD is said uplink dominated traffic, the first SAS bases the selection of the first frequency spectrum channel on adjacent channel interference.

In some such embodiments, the method of further includes determining, by the first Spectrum Access System, a frequency spectrum channel with the least amount of adjacent channel interference from the plurality of available frequency spectrum channels and the step of basing said first frequency spectrum channel selection on adjacent channel interference includes selecting the frequency spectrum channel determined to have the least amount of adjacent channel interference as the first frequency spectrum channel. When the determined type of traffic being carried by the first CBSD is downlink dominated traffic the first SAS bases the selection of the first frequency spectrum channel on co-channel interference. In some such embodiments, the method includes the step of determining, by the first Spectrum Access System, a frequency spectrum channel with the least amount of co-channel interference from the plurality of available frequency spectrum channels and the step of basing said first frequency spectrum channel selection on co-channel interference includes selecting the frequency spectrum channel determined to have the least amount of co-channel interference as the first frequency spectrum channel.

When the determined type of traffic being carried by the first CBSD is said balanced downlink and uplink traffic determining said first frequency spectrum channel selection on co-channel interference and adjacent channel interference the method may, and some does include the step of determining, by the first Spectrum Access System, frequency spectrum channels with a moderate amount of co-channel interference and a moderate amount of adjacent channel interference from the plurality of available frequency spectrum channels. In some of embodiments of such methods, the step of basing said first frequency spectrum channel selection on co-channel interference and adjacent channel interference includes selecting one of the frequency spectrum channels determined to have a moderate amount of co-channel interference and a moderate amount of adjacent channel interference as the first frequency spectrum channel. In some embodiments, the method determines a moderate amount of co-channel interference by comparing a frequency spectrum channel co-channel to a first and a second co-channel interference thresholds and determining that the frequency spectrum channel has a moderate amount of co-channel interference when the co-channel interference for the channel is above a first (or lower) co-channel interference level threshold and below a second (or upper) co-channel interference level threshold. In some embodiments, the determination of channels with a moderate amount of adjacent channel interference is determined in the same manner by comparing the frequency spectrum channel adjacent interference level to first and second adjacent channel interference threshold and determining the channel has a moderate amount of adjacent channel interference when it is above a first (lower) adjacent channel interference level threshold and below a second co-channel interference level threshold.

The frequency spectrum channel is typically a block or band of contiguous frequencies. In some embodiments an exemplary frequency spectrum channel is a 10 MHz band of contiguous frequencies. Adjacent channel interference is interference caused by wireless transmissions in frequency spectrum channels which are adjacent channels in the frequency spectrum either above or below a selected frequency spectrum channel. Co-channel interference is interference caused by unwanted wireless transmissions in the same frequency spectrum channel as the selected frequency spectrum channel when multiple CBSDs are assigned the same frequency spectrum channel.

In some embodiments, prior to receiving the first channel message, the first SAS receives a registration request from the first CBSD and the first SAS then registers the first CBSD at the first Spectrum Access System. In response to the registration of the first CBSD, the SAS performs the steps of: selecting, by the first Spectrum Access System, an initial frequency spectrum channel for the first CBSD from the plurality of available frequency spectrum channels based on a location of the first CBSD and co-channel interference; assigning, by the first Spectrum Access System, the selected initial frequency spectrum channel to the first CBSD; communicating, by the first Spectrum Access System, information identifying the assigned initial frequency spectrum channel to the first CBSD; and communicating a first time interval to the first CBSD, said first time interval defining an amount of time during which the first CBSD is to determine the type of traffic being carried by the first CBSD. Method embodiments of the present invention may also includes the steps of: receiving, by the first CBSD from the first SAS in response to registering with the first SAS, said information identifying the initial frequency spectrum channel assigned to the first CBSD and the first time interval; operating the first CBSD to communicate with UEs being serviced by the first CBSD during the first time interval using the initial frequency spectrum channel assigned to the first CBSD; measuring during the first time interval, by the first CBSD, the amount of uplink traffic and downlink traffic being carried by the first CBSD; determining whether the traffic type being carried by the first CBSD during the first time interval is downlink dominated traffic, uplink dominated traffic or balanced downlink and uplink traffic based on the measured amount of uplink traffic and downlink traffic being carried by the first CBSD during the first time interval; reporting by the first CBSD to the first SAS the determined traffic type being carried by the first CBSD during the first time interval.

In some embodiments, the first SAS determines whether to assign a different spectrum access channel to the first CBSD based on one or more of the following: the received information identifying the type of traffic being carried by the first CBSD, the average uplink bit error rate, and the average UE power headroom value. In some of such embodiments, the first SAS determines to assign a different frequency spectrum channel to the first CBSD when the determined traffic type is uplink dominated traffic and either the uplink bit error rate is greater than an uplink bit error rate threshold or the average UE power headroom value is greater than an average UE power headroom threshold. In some other embodiments, the first SAS determines to assign a different frequency spectrum channel to the first CBSD when the determined traffic type is uplink dominated traffic and both the uplink bit error rate is greater than an uplink bit error rate threshold and the average UE power headroom value is greater than an average UE power headroom threshold. In some embodiments when the first CBSD traffic type is uplink dominated traffic, the first CBSD on a continuous basis measures the average uplink bit error rate and/or the average UE power headroom value over a pre-determined time period specified by the first SAS and reports the measured average uplink bit error rate and/or the average UE power headroom value back to the first SAS which uses the information to select an updated channel assignment for the first CBSD.

The present invention is applicable to apparatus and system embodiments wherein one or more devices implement the steps of the method embodiments. In some apparatus embodiments each of the CBSDs, user equipment devices, SAS devices and each of the other apparatus/devices of the system include one or more processors and/or hardware circuitry, input/output interfaces including receivers and transmitters, and a memory. The memory including instructions which when executed by one or more of the processors control the apparatus/device of the system to operate to perform one or more steps or functions of the various method embodiments of the invention.

The present invention is also applicable to and includes apparatus and systems such as for example, apparatus and systems that implement the steps of the method embodiments. For example, a communications system including a Spectrum Access System (SAS) located in a Citizens Broadband Radio Service (CBRS) network that allocates frequency spectrum resources to Citizens Broadband Radio Service Devices operating in the CBRS network, the communications system including a Spectrum Access System including: one or more processors that control the operation of the Spectrum Access System (SAS) to perform the following operations: receive a first channel message from a first Citizens Broadband Radio Service Device (CBSD) of the CBRS network; select in response to the received first channel message, a first frequency spectrum channel from a plurality of available frequency spectrum channels based on a type of traffic the first Citizens Broadband Radio Service Device is carrying; assign the selected first frequency spectrum channel to the first CBSD for use in wireless communications with user equipment devices; communicate information identifying the assigned first frequency spectrum channel to the first CBSD. In some embodiments, the system first channel message includes one or more of the following: a frequency spectrum channel allocation request such as for example a channel replacement or update request, information indicating the type of traffic the first CBSD is carrying, an UE average power headroom value and an uplink average bit error rate. In the communications system the selected first frequency spectrum channel is used by the first CBSD for both uplink and downlink communications with user equipment devices being serviced by said first CBSD. The type of traffic the first CBSD is carrying is one of the following traffic types: downlink dominated traffic type, uplink dominated traffic type, and balanced downlink and uplink traffic type.

In some system embodiments, the one or more processors included in the Spectrum Access System further control the Spectrum Access System to perform the following operations: prior to selecting the first frequency spectrum channel determining the type of traffic the first CBSD is carrying based on information provided by the first CBSD to the first Spectrum Access System; and when the determined type of traffic being carried by the first CBSD is said uplink dominated traffic basing said first frequency spectrum channel selection on adjacent channel interference; and when the determined type of traffic being carried by the first CBSD is said downlink dominated traffic basing said first frequency spectrum channel selection on co-channel interference; and when the determined type of traffic being carried by the first CBSD is said balanced downlink and uplink traffic determining said first frequency spectrum channel selection on co-channel interference and adjacent channel interference.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
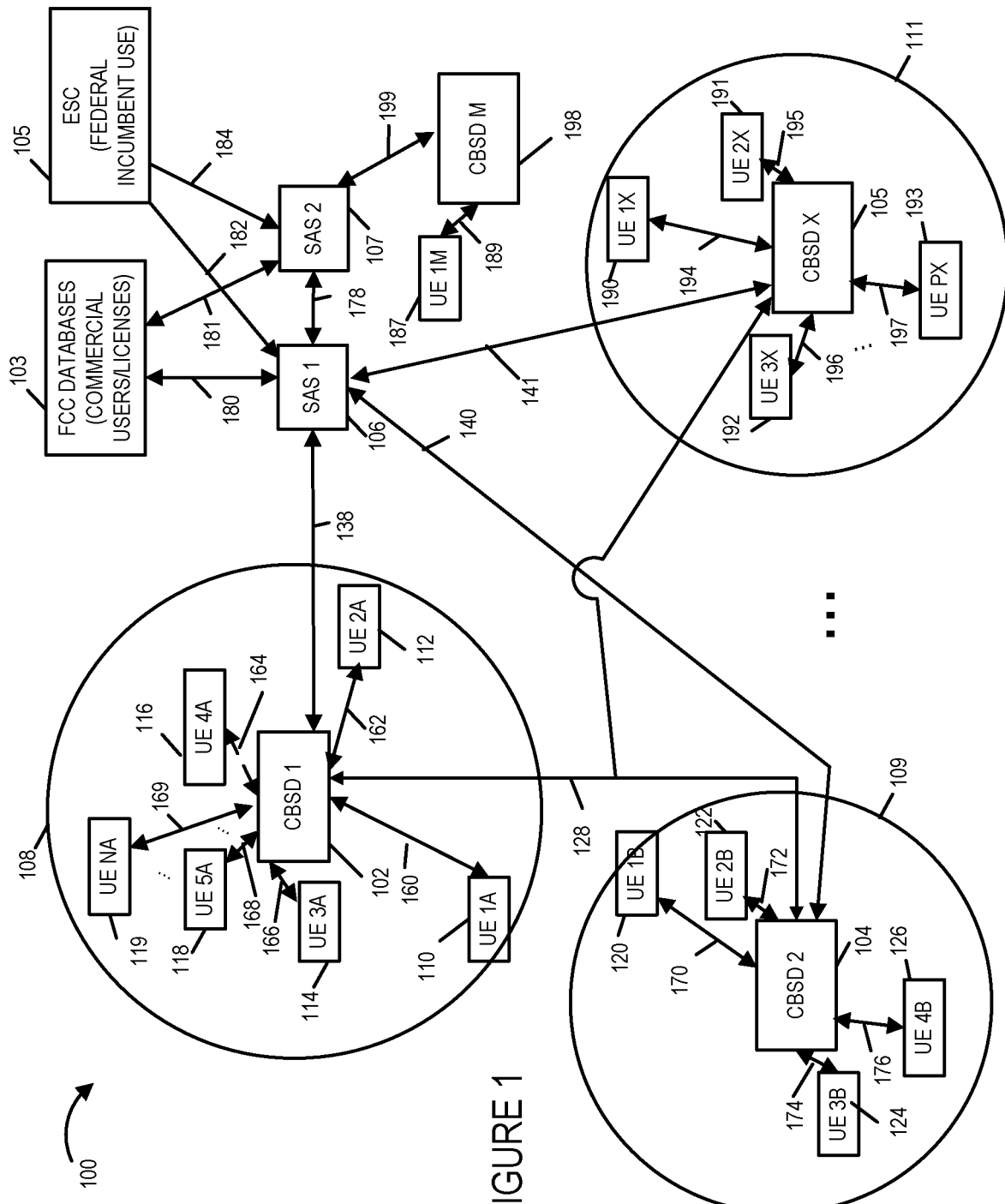
FIG. 1 illustrates an exemplary Citizens Broadband Radio Service network system 100 that provides wireless communications services in accordance with one embodiment of the present invention.

The current invention is applicable to Citizens Broadband Radio Service (CBRS) networks that provide wireless communications services. The present invention relates to new and/or improved methods, systems and apparatus to manage, implement and control the allocation and assignment of frequency spectrum resources, e.g., frequency channel(s), to Citizen Broadband Radio Service Devices (CBSDs) by Spectrum Access Systems in a CBRS network. Whereas some known current Spectrum Access Systems assign spectrum based on only the co-channel interference level each CBSD is experiencing at a particular location, there are also out of band emissions issues, which is known as a signal leakage out of the band (frequency channel) of operation. This out of band signal leakage is referred to as adjacent channel interference (ACI). Adjacent channel interference is a problem for downlink transmissions from a CBSD to the UEs it is servicing as well as uplink transmission from the UEs it is servicing to the CBSD. However, adjacent channel interference impacts uplink transmission more than it does downlink transmission since the uplink transmission power is limited by the UEs maximum transmission power. The present invention is directed to new and/or improved methods of frequency bandwidth and channel allocation based on the traffic in the CBRS network.

The present invention bases the assignment of frequency spectrum, e.g., frequency channels also referred to as channels herein, to CBSDs based on, among other things, the traffic type of the CBSD. In some embodiments, the SAS also makes the CBSD channel assignment based on additional information including for example co-channel interference determinations or measurements, adjacent channel interference determinations or measurements, an average UE power headroom value provided by the CBSD to the SAS, and/or an average uplink bit error rate provided by the CBSD to the SAS. The SAS using the CBSD provided information can more efficiently and effectively allocate the frequency spectrum resources it is managing among the CBSDs so that the frequency channel assignments can take into account the usage of the frequency channels by the CBSDs being managed. For example by taking into account the CBSD's traffic type, the SAS can assign to a CBSD a channel that reduces or minimizes the type of interference which will have the most negative impact on the CBSD's transmission and thereby provide a better experience for the users of the UE devices of the CBRS network and make more efficient use of the limited frequency spectrum resources available in the CBRS network. For example, the SAS can assign a CBSD with uplink dominated traffic a channel with the least amount of adjacent channel interference thereby minimizing a type of signal interference which is known to adversely impact uplink traffic more than downlink traffic.

Citizens Broadband Radio Service networks are networks that include user equipment devices, e.g., mobile or wireless devices such as for example cell phones, smart phones, laptops, tablets, drones, autonomous vehicles with wireless communications, mobile healthcare devices, e.g., fitbit device, Citizens Broadband Radio Service Devices (CBSDs) which serve as access points/base stations, and Spectrum Access Systems which provide spectrum assignments and manage frequency interference through power management of the CBSDs' transmission power and the assignment of frequency channels. The Citizens Broadband Radio Service network utilizes the 150 megahetz in the 3550-3700 MHz band referred to as the 3.5 GHz Band. One important aspect of the CBRS network is the limitation of interference, e.g., radio transmission, from multiple transmission sources, e.g., multiple CBSD devices located near each other or in close proximity to one another. The CBRS network includes Spectrum Access Systems that obtain information about registered or licensed commercial users in the 3.5 GHz band from FCC databases and information about federal incumbent users of the band from ESC (Environmental Sensing Capability) system and interact directly or indirectly with CBSDs operating in the band to ensure that Citizens Broadband Radio Service users operate in a manner consistent with their authorizations and promote efficient use of the spectrum resource. Among the Spectrum Access System functions as defined in the Amendment of the Commission's Rules with Regard to Commercial Operations in the 3550-3650 MHz Band released Apr. 21, 2015 are that: it determines the available frequencies at a given geographic location and assign them to CBSDs; it determines the maximum permissible transmission power level for CBSDs at a given location and communicates that information to the CBSDs; it registers and authenticates the identification information and location of CBSDs; it enforces exclusion and protection zones, including any future changes to such Zones, to ensure compatibility between Citizens Broadband Radio Service users and incumbent federal operations; it protects Priority Access Licensees (PAL) from impermissible interference from other Citizens Broadband Radio Service users; ensures secure and reliable transmission of information between the SAS, ESC, and CBSDs; and it facilitates coordination and information exchange between SASs. Through the management of the CBSD's power transmission levels in a geographical area the SAS manages the radio interference in the geographical area.

The amount of uplink traffic and downlink traffic changes based on the traffic type a particular CBSD carries. The same frequency channel assigned to a CBSD is used for both uplink and downlink traffic. Down link dominated traffic types are video, file transfer protocol (FTP), and web traffic in which the amount of signaling and data messages transmitted from the CBSD to the UE(s) it is servicing is far greater than the amount of signaling and data messages transmitted from the UEs to the CBSD. Uplink dominated traffic types are autonomous vehicle communications (e.g., transferring performance data from the vehicle, e.g., vehicle sensors, to the CBSD), healthcare data (from devices located on the body of a user, e.g., health sensor devices, to the CBSD), and drone traffic (from the drone, e.g., video, audio, etc. to the CBSD). In the present invention, the decision metrics for channel allocation or assignment changes depending on the traffic type.

Various embodiments of the present invention describe methods, apparatus, systems and techniques for efficiently and effectively assigning and/or allocating frequency spectrum, e.g., frequency channels, to Citizens Broadcast Radio Service Devices for use in communicating with user equipment devices it is servicing in a CBRS network to maximize the use of the allocated spectrum by selecting the frequency spectrum, e.g., frequency channels, assigned to CBSDs based on the CBSDs use of the assigned frequency spectrum, e.g., based on the traffic type of the CBSD. In this way, the frequency spectrum, e.g., channel, can be selected so as to minimize interference and provide a higher quality of service to the UEs being serviced by the CBSDs.

FIG. 1 illustrates an exemplary CBRS network communications system 100 having an architecture implemented in accordance with the present invention. The CBRS communications network system 100 includes a plurality of Citizens Broadband Radio Service Devices (CBSDs) including CBSD 1 102, a CBSD 2 104, . . . , a CBSD X 105 (X being positive number), CBSD M 198, a Spectrum Access System device 1 (SAS 1) 106, a SAS 2 107, an FCC Databases of commercial users/licenses 103, an Environmental Sensing Capability (Federal Incumbent Use) (ESC) system 105, a plurality of user equipment (UE) devices UE 1A 110, UE 2A 112, UE 3A 114, UE 4A 116, UE 5A 118, . . . , UE NA 119, UE 6B 120, UE 7B 122, UE 8B 124, UE 9B 126, UE 1X 190, UE 2X 191, UE 3X 192, . . . , UE PX 193, UE 1M 189, communications links 128, 138, 140, 141, 160, 162, 164, 166, 168, . . . , 169, 170, 172, 174, 176, 178, 180, 181, 182, 184, 189, 194, 195, 196, 197, 199, and a plurality of cells including first cell 108, a second cell 109, . . . , a Xth cell 111.

The first cell 108 of the CBRS network is serviced by CBSD 1 102. The first cell 108 illustrates the wireless coverage range of CBSD 1 102 at a first time T1. A plurality of user equipment devices also sometimes referred to as user terminal devices UE 1A 110, UE 2A 112, UE 3A 114, UE 4A 116, UE 5A 118, . . . , UE NA 119 where N is an integer greater than 5 are located in the first cell 108 are in active wireless communications with CBSD 1 102 that is they are attached to CBSD 1 102, e.g., these UEs are being serviced by CBSD 1 102. Communications links 160, 162, 164, 166, 168, . . . , 169 illustrate wireless communications channels, e.g., radio channels, over which CBSD 1 102 and UE 1A 110, UE 2A 112, UE 3A 114, UE 4A 116, UE 5A 118, . . . , UA NA communicate respectively.

The second cell 109 of the CBRS network is serviced by CBSD 2 104. The second cell 109 illustrates the wireless coverage range of CBSD 2 104 at the first time T1. The user equipment devices UE 6B 120, UE 7B 122, UE 8B 124 and UE 9B 126 are located in the second cell 109 and are in communication with CBSD 2 104. Communications links 170, 172, 174 and 176 illustrate wireless communications channels, e.g., radio channels, over which CBSD 2 104 and UE 6 120, UE 7 122, UE 8 124, and UE 9 126 communicate respectively.

The Xth cell 111 of the CBRS network is serviced by CBSD X 105. The Xth cell 111 illustrates the wireless coverage range of the CBSD X 105 at the first time T1. The user equipment devices UE 1X 190, UE 2X 191, UE 3X 192, . . . , UE PX 193 are located in the Xth cell 111 and are in communication with CBSD X 105. Communications links 194, 195, 196, . . . , 197 illustrates wireless communications channels, e.g., radio channels, over which CBSD X 105 and UE 1X 190, UE 2X 191, UE 3X 192, . . . , UE PX 193 communicate respectively.

CBSD M 198 is coupled to SAS 2 107 via communication link 199. The CBSD M 198 services a plurality of UE devices only one of which is illustrated UE 1M 187 which is coupled to CBSD M 198 via wireless link 189. SAS 2 107 manages the CBSDM 198 spectrum allocation and transmission power to limit interference in the CBRS network.

SAS 1 106 is coupled to SAS 2 107 via communications link 178. SAS 1 106 is coupled to FCC Databases 103 via communications link 180. SAS 2 107 is coupled to FCC Databases 103 via communications link 181. ESC system 105 is coupled to SAS 1 106 and SAS 2 107 via communications links 182 and 184. The ESC system is used, for among other things, to detect, sense Navy radar operations in CBRS operation within 3550-3650 MHz near the coasts and provide notifications over the communications links to SAS 1 106 and SAS 2 107. SAS 1 106 manages the CBSD 1 102, CBSD 2 104, . . . , CBSD X 105 spectrum allocation and transmission power to limit interference in the CBRS network. SAS 2 107 manages other CBSDs in the CBRS network which are not shown in FIG. 1. SAS 1 106 and SAS 2 107 communicate and share information regarding the CBRS network coverage of the CBSDs each respectively manage and coordinate management of the allocation of spectrum and power transmission levels of CBSDs throughout the CBRS network. While only two SAS devices are shown in FIG. 1 it should be understood that additional SAS devices are typically used in the CBRS network. The communications link 128 couples CBSD 1 102, CBSD 2 104, . . . , CBSD X 105 together so that they can exchange information.

The communications links 128, 138, 140, 141, 178, 180, 181, 182, 184, 199 are typically wired communications links or fiber optic cables. The communications links 160, 162, 164, 166, 168, . . . , 169, 170, 172, 174 and 176, 189, 194, 195, 196, . . . , 197 are wireless or over the air communications links. The communications link 138 couples the CBSD 1 102 to SAS 1 106. The communications link 140 couples the CBSD 2 104 to SAS 1 106. The communications link 141 couples the CBSD X 105 to SAS 1 106. It is to be understood that the communication links shown in system 100 are only exemplary and other network configurations and communications links may be employed that couple together the devices, servers, nodes, entities, databases and controllers of the system. Elements or steps with the same reference numbers used in different figures are the same or similar and those elements or steps will not be described in detail again.

While for the sake of simplicity in explaining the invention system 100 only illustrates in detail four active CBSD devices, two SAS devices and a few UE devices, it will be appreciated that system 100 typically includes a large plurality of active CBSDs in the CBRS network supporting a large plurality of UE devices and being managed by a plurality of SAS devices which are in communication with one another.

In the system 100, there is limited frequency spectrum available in the CBRS network. When CBSD 1 102 and CBSD M 198 are assigned the same frequency channel, i.e., frequency channel 3560 MHZ for communications, CBSD 1 102 and CBSD M 198, can experience co-channel interference. This occurs when signals transmitted on the 3560 MHZ channel between CBSD M 198 and the UEs it is servicing, e.g., UE 1M 187 are received by CBSD 1 102 or the UEs that are being serviced by CBSD 1 102, e.g., UE 1A 110, UE 2A 112, UE 3A 114, UE 4A 116, UE 5A 118, . . . , UE NA 119. Similarly, the CBSD M 198 and the UEs it is servicing experience co-channel interference when signals exchanged between CBSD 1 102 and the UEs it is supported are received by CBSD M 198 and the UEs it is servicing, e.g., UE 1M 187. CBSD 1 102 can also experience adjacent channel interference. This can occurs for example when CBSD 2 104 and CBSD X 105 are assigned channels adjacent in frequency to the frequency channel assigned to CBSD 1 102. For example, if CBSD 1 is assigned 3560 MHZ frequency channel and CBSD 2 104 is assigned 3559 MHZ frequency channel for use in communicating with the UEs it is servicing. There will be some signal leakage between the signals transmitted on the 3559 MHz frequency channel into the 3560 MHZ frequency that is referred to as adjacent channel interference. Similarly if CBSD X 105 is assigned 3561 MHz frequency channel to use for communicating with the UEs it is servicing there will be some leakage between the signals transmitted in the 3561 MHZ frequency channel into the 3560 MHz channel that is referred to as adjacent channel interference. The present invention takes both co-channel interference and adjacent channel interference into account when assigning or allocating channels to CBSDs based on a CBSD's traffic type. While single frequency channels have been discussed in practice the SAS typically assigns or allocates a contiguous block of frequencies as a channel, e.g., a channel could include the frequencies from 3560 to 3569 which is 10 MHz channel.

Figure 2:
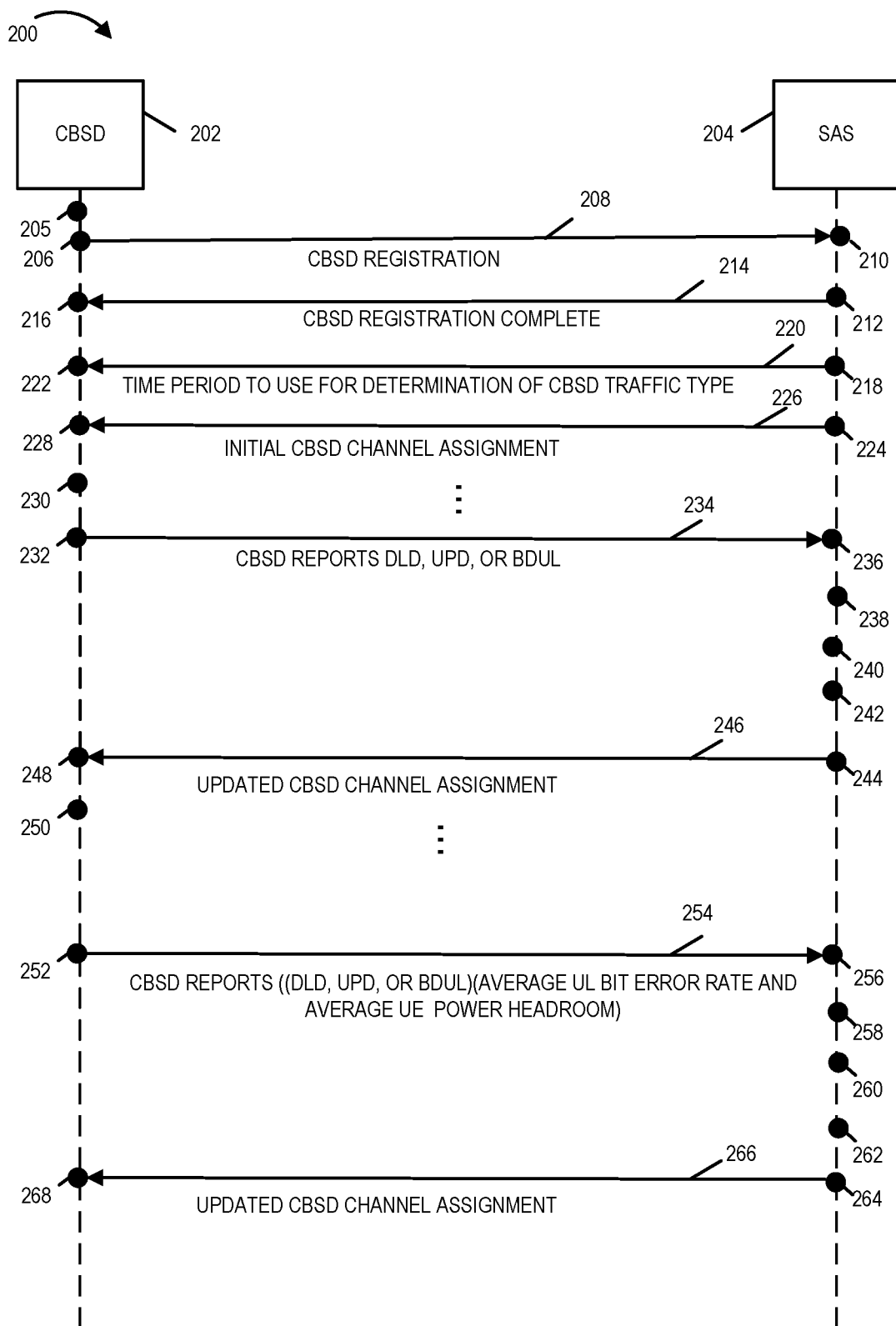
FIG. 2 illustrates an exemplary method and signaling diagram in accordance with one embodiment of the present invention.

FIG. 2 is a simplified signaling diagram 200 illustrating the steps of an exemplary method in accordance with one embodiment of the present invention. The signaling diagram 200 illustrates the steps, messages and signaling in which a CBSD, e.g., CBSD 1 102, registers with an SAS, e.g., SAS 1 106 of a CBRS network and as part of the registration or attachment phase receives parameters, data, and/or information, e.g., time duration for use in determining CBSD traffic type, to be used by the CBSD to provide the SAS with UE information to be used by the SAS in evaluating its channel assignment to the CBSD. Time progresses downward from the top of the signaling diagram to the bottom on the signaling diagram. While it will be appreciated that additional signaling may be, and typically is, required for a CBSD registration with the SAS and the exchange of signals/messages in the method, the simplified diagram focuses on the signals used in one or more embodiments of the present invention. The exemplary signaling method 200 may be implemented on the exemplary CBRS network system 100 illustrated in FIG. 1 although it should be understand that the method may be implemented using other systems and other system configurations then those illustrated in FIG. 1.

The method 200 begins in start step 205 wherein the CBSD 202 e.g., CBSD 1 102 of system 100, and the SAS 204, e.g., SAS 1 106 of system 100, are initialized. Operation proceeds from step 205 to step 206.

In step 206, the CBSD 202 generates and transmits CBSD registration message 208 to SAS 204 to register with the SAS 204 of the CBRS network. Operation proceeds from step 206 to step 210.

In step 210, the SAS 204 receives the CBSD registration request message 208 and registers CBSD 202 in the CBRS network. Operation proceeds from step 210 to step 212.

In step 212, SAS 204 generates and transmits a CBSD registration complete or acknowledgement message to CBSD 202 acknowledging that the CBSD 202 has been successfully registered. Operation proceeds from step 212 to step 216.

In step 216, the CBSD 202 receives and processes the CBSD registration complete/acknowledgement message 214 from SAS 204. Operation proceeds from step 216 to step 218.

In step 218, the SAS 212 generates and sends a time period or time duration the CBSD is to use for determining the CBSD's traffic type message 220. For example, the time duration or period may be, and in some embodiments is, one hour, one day, one week, one month. The SAS will determine the time duration based on the amount of time that the SAS believes is necessary for the CBSD to make an accurate determination of the type of traffic that the CBSD is handling over the period of time between updates of the CBSD's channel assignment. For example, the SAS may send a time duration of 1 week so that the CBSD can have a full week's worth of data (including work and non-work days) to use in determining the type of traffic that the CBSD is servicing. In some such embodiments, the SAS may only update channel assignments on a weekly basis. In some embodiments, the SAS 204 also includes in message 220 one or more traffic threshold values for use by the CBSD 202 in determining the whether the traffic type the CBSD 202 is servicing is uplink (UL) dominated traffic, downlink (DL) dominated traffic or balanced downlink and uplink (BDUL) traffic. For example, the SAS 204 may send a threshold value of 10% such that if the CBSD 202 determines that there is only a 10% difference between the uplink and downlink traffic then the traffic is determined to balanced downlink and uplink traffic. Otherwise if the difference between the uplink and downlink traffic is greater than 10% the CBSD 202 determines that it is servicing uplink dominated (UPD) traffic when the percentage of uplink traffic is greater than the downlink traffic and the CBSD 202 determines that that is servicing downlink dominated (DLD) traffic when the percentage of downlink traffic is greater than the uplink traffic. Operation proceeds from step 218 to step 222.

In step 222, the CBSD 202 receives and processes the message 220 and extracts the time period or time duration the CBSD is to use for determining the CBSD's traffic type from the message 220. In embodiments in which one or more traffic threshold value has been included in message 220, the CBSD 202 extracts the one or more traffic threshold values as well as the time duration or time period value. In some embodiments, the CBSD 202 stores the extracted information in memory for future reference. Operation proceeds from step 222 to step 224.

In step 224, the SAS 204 assigns an initial channel on which the CBSD is to communicate, e.g., with the user equipment devices (UEs) that it is servicing, and transmits the channel assignment to the CBSD in initial channel assignment message 226. The step 224 includes the sub-step of the SAS 204 selecting the initial channel from the available channels based on co-channel interference. The SAS 204 selects the unassigned channel that the SAS determines will have the least co-channel interference. The step 224 also includes the sub-step of generating the message 226. Though not shown the SAS 204 also determines and sends the CBSD 202 the transmit power level at which the CBSD 202 is to operate. This is done so that the SAS can manage the available spectrum resource of the CBRS network as efficiently as possible. Operation proceeds from step 224 to step 228.

In step 228, the CBSD 202 receives and processes the initial CBSD channel assignment message 226. Operation proceeds from step 228 to step 230.

In step 230, the CBSD 202 begins servicing the UEs in its coverage area, e.g., CBSD 1 102 of FIG. 1 begins servicing UE 1A 110, UE 2A 112, UE 3A 114, UE 4A 116, UE 5A 118, . . . , UE NA 119 of system 100 as they are within cell 108 which is the wireless coverage range for CBSD 1 102. The CBSD 202 also starts a timer, e.g., either a hardware timer or a software timer loaded with the time duration or period included in the message 220. Until the timer expires at the end of the time period or duration, the CBSD 202 is operated to determine the type of traffic that CBSD 202 is servicing. The CBSD 202 determines whether it is serving uplink dominated (ULD) traffic, downlink dominated (DLD) traffic or balanced downlink and uplink (BDUL) traffic. The CBSD 202 may, and in some embodiments does, make this determination by measuring or counting the number or amount of uplink physical resource blocks used for uplink communications from the UEs it is servicing and by measuring or counting the number or amount of downlink physical resource blocks it is using for communications from the CBSD to the UEs it is servicing. UEs being serviced by the CBSD are allocated a specific number of subcarriers for a predetermined amount of time. These are referred to as physical resource blocks (PRBs), e.g., LTE specifications discussion of PRBs. PRBs thus have both a time and frequency dimension. Allocation of PRBs is handled by a scheduling function at the base station which is the CBSD.

The CBSD performs these measurements for the period of time or time duration specified in message 220. When the timer expires at the end of the time period or time duration, the CBSD 202 makes a determination of the traffic type it is servicing based on the measurements/counting of the physical resource blocks used for the uplink communications from the UE to the CBSD 202 and used for the downlink communications from the CBSD 202 to the UE. The traffic type being serviced being one of the following traffic types: uplink dominated traffic, downlink dominated traffic or balanced downlink and uplink traffic. In some embodiments, the CBSD 202 also makes this determination based on one or more traffic threshold values. The one or more traffic threshold values may be, and in some embodiments are, one or more traffic threshold value(s) communicated to the CBSD 202 from the SAS 204. In some other embodiments, the CBSD 202 may use one or more traffic threshold value(s) which was not communicated to the CBSD 202 from the SAS 204 but was communicated from the CBSD network operator or defined during the initialization step 205. The use of the SAS 204 communicated threshold value allows the SAS 204 to ensure that different CBSDs are all using the same method to determine the type of traffic that the different CBSDs are reporting. In contrast the use of a CBRS network operator provided traffic threshold values gives the CBRS network operator the ability to define the type of traffic the CBSD is experiencing so that it can more tightly control and define how each of the three traffic types DLD, UPD and BDUL traffic are categorized, e.g., an operator of one CBSD may want a very narrow percentage of traffic to be considered BDUL (e.g., 1% difference between uplink and downlink traffic) while an operator of another CBSD may choose to have a larger percentage be considered BDUL traffic (e.g., 10% difference between uplink and downlink traffic). Upon the completion of the determination of the traffic type being serviced by the CBSD 202, operation proceeds from step 230 to step 232.

In step 232, the CBSD 202 generates the CBSD traffic type report message 234 and transmits the message 234 to the SAS 204. The CBSD traffic type report message 234 includes an indication as to whether the traffic type being serviced by the CBSD 202 over the specified duration of time or time period is downlink dominated traffic, uplink dominated traffic or balanced downlink and uplink traffic. In some embodiments, the message 234 also includes the traffic measurements made during the time period as well as the starting time and ending time of the time period so that the SAS 204 can compare the traffic types against the traffic types reported by other CBSDs when making channel re-assignments. For example, while both CBSD 1 102 and CBSD 2 104 may both be uplink dominated traffic the amount of traffic CBSD 1 102 is servicing may be far greater than the amount of traffic that CBSD 2 104 is servicing and therefore the SAS 204 may take this into account when determining which CBSD 1 102 or CBSD 2 104 to give priority when making channel re-assignments. For example, the SAS may chose to give priority to the CBSD with the higher amount of traffic over the CBSD with the lower amount of traffic so as to make the most efficient use of the available frequency spectrum. Operation proceeds from step 232 to step 236.

In step 236, the SAS 204 receives and processes the CBSD traffic type report message 234 transmitted from CBSD 202. Operation proceeds from step 236 to step 238.

In step 238, The SAS 204 determines from CBSD traffic type report message 234 whether the CBSD 202's traffic is downlink dominated traffic, uplink dominated traffic, or balanced downlink and uplink traffic. Operation proceeds from step 238 to step 240.

In step 240, the SAS 204 will determine an updated channel assignment for CBSD 202 based on the traffic type determined for CBSD 202. When SAS determines that the CBSD 202 has downlink dominated traffic, the SAS 204 determines or measures the co-channel interference of the channels available for assignment and selects the available channel with the least amount of co-channel interference to be assigned to the CBSD 202 via an updated channel assignment. The SAS 204 for downlink dominated traffic CBSD does not determine adjacent channel interference or base the selection of the channel assignment for the CBSD on adjacent channel interference. When the SAS 204 determines that the CBSD 202 traffic is uplink dominated traffic, the SAS 204 determines and/or measures both the adjacent channel interference and the co-channel interference of the available channels. The SAS 204 then selects the channel with the least adjacent channel interference from among the available, i.e., unassigned, frequency channels to be assigned to CBSD 202 as an updated channel assignment. In some embodiments, after identifying the channel with the least adjacent channel interference, the SAS 204 also bases the channel selection on the co-channel interference such that the selected channel has the least adjacent channel interference but also has an acceptable co-channel interference level. When the SAS 204 determines that the CBSD 202's traffic is balanced downlink and uplink traffic, the SAS 204 determines and/or measures both the adjacent channel interference and the co-channel interference of the available channel. The SAS 204 then selects a channel with moderate co-channel and adjacent channel interference from among the available, i.e., unassigned, frequency channels, to be assigned to CBSD 202 as an updated channel assignment. The SAS 204 reserves the channels with the least co-channel interference for CBSDs with downlink dominated traffic and the channels with the least adjacent channel interference for the CBSDs with uplink dominated traffic. Operation proceeds from step 240 to step 242.

In step 242, the SAS 204 generates updated channel assignment message 246 which includes the channel selected in step 240 based on the CBSD 202 traffic type determined by SAS 204. The message 246 may, and in some embodiments does, also include a new time duration or time period for use in determining CBSD 202's traffic type. The message 246 may also include a request or command for the CBSD 202 to determine and report to the SAS 204 the average uplink bit error rate and/or average UE power headroom rate for a period of time, e.g., the time period received in message 220 or the updated time period included in the message 246. Operation proceeds from step 242 to step 244.

In step 244, the SAS 204 transmits the updated channel assignment message 246 to the CBSD 202. Operation proceeds from step 244 to step 248.

In step 248, the CBSD 202 receives and processes the updated CBSD channel assignment message 246. In some embodiments, the CBSD 202 stores the updated channel assignment and any other instructions or information in memory for future reference. Operation proceeds from step 248 to step 250.

In step 250, the CBSD 202 implements the channel change and begins using the updated channel identified in message 246 for communications with the UEs it is servicing. The CBSD 202 also re-starts the timer loaded with the time duration or period included in the message 246 or if no time period is included in the message 246 then with the time period included in the message 220. Until the timer expires at the end of the time period or duration, the CBSD 202 is operated to determine the type of traffic that CBSD 202 is servicing. If the message 246 also received a request, instruction or command to determine the average uplink bit error rate and/or the average UE power headroom, the CBSD 202, the CBSD 202 is also operated to determine the requested, instructed, or commanded average uplink bit error rate and average UE power headroom from information received from the UEs it is servicing during the specified time period. At the expiration of the specified time period, the the CBSD 202 determines whether it is serving uplink dominated (ULD) traffic, downlink dominated (DLD) traffic or balanced downlink and uplink (BDUL) traffic, e.g., based on the measured or counted uplink physical resource blocks used and downlink physical resource blocks used. In some embodiments, e.g., those embodiments in which the SAS 204 requested the average UE power headroom, the CBSD 202 determines an average UE power headroom value by averaging the power headroom values received from UEs being serviced by CBSD 202 during the time period. In some embodiments, e.g., those embodiments in which the SAS 204 requested the average uplink bit error rate, the CBSD 202 determines an average uplink bit error rate from the uplink bit error rates generated from the communication signals received from the UE devices CBSD 202 serviced during the time period. In some embodiments, the average uplink bit error rate and/or average UE power headroom values are only generated upon receipt of a request, instruction or command for the information from the SAS 204. In some embodiments, the average UE power headroom value and/or average uplink bit error rate are generated based on whether in step 232 the CBSD 202 reported its traffic type as being uplink dominated traffic. In some embodiments, in step 250 the CBSD 202 does not determine the type of traffic it is servicing but only determines the average uplink bit error rate and the average UE power headroom. Operation proceeds from step 250 to step 252.

In step 252, the CBSD 202 generates message 254 which includes the CBSD 202 traffic type (downlink dominated traffic type, uplink dominated traffic type or balanced downlink and uplink traffic type) and in some embodiments the average uplink bit error rate and/or the average UE power headroom which was determined in step 250. In some embodiments, e.g., when the traffic type has already been well established or has not changed since the last reported traffic type determination, the message 254 does not include the CBSD 202 traffic type but may, and in some embodiments does include, the determined average uplink bit error rate and/or the average UE power headroom. Once the message 254 has been generated it is transmitted from CBSD 202 to SAS 204 as part of step 252. Operation proceeds from step 252 to step 256.

In step 256, the SAS 204 receives and processes the message 254 extracting the CBSD reported information included in the message, e.g., the CBSD 202 traffic type, average uplink bit error rate and/or average UE power headroom. The message may, and in some embodiments does, also include the time period over which the reported information was generated so that the SAS 204 can use the information for evaluating the accuracy of the SAS 204's own determinations, e.g., co-channel interference and adjacent channel interference, and channel assignment decisions. The process information may be, and in some embodiments is, stored in memory in the SAS 204 for later reference. Operation proceeds from step 256 to step 258.

In step 258, the SAS 204 determines whether the CBSD 202's traffic is downlink dominated traffic, uplink dominated traffic, or balanced downlink and uplink traffic and uses the received CBSD 202 information, e.g., the average uplink bit error rate and/or the UE average power headroom information, to evaluate the accuracy of the SAS 204 co-channel interference and/or adjacent channel interference determinations and CBSD 202 channel assignment. Operation proceeds from step 258 to step 260.

In step 260, the SAS 204 determines whether the CBSD 202 channel assignment should be updated based on the determined CBSD 202 traffic type and/or the reported average uplink bit error and/or the average UE power headroom value. In some embodiments, the SAS 204 determines that a CBSD 202 channel assignment is to be updated when the CBSD 202 traffic type changes. In some embodiments, the SAS 204 determines that the CBSD 202 channel assignment should be updated when the determined CBSD 202 traffic type is uplink dominated traffic and the CBSD 202 average uplink bit error rate is greater than an uplink bit error rate threshold and/or CBSD 202 average UE power headroom is greater than a power headroom threshold. In some embodiments, the CBSD 202 determines that the CBSD 202 channel assignment is to be updated based on interference, co-channel and/or adjacent channel interference determinations the SAS 204 has made during the reported time period.

When the SAS 204 determines that the channel assignment to CBSD 202 should be updated, the SAS 204 proceeds to select a new channel assignment for the CBSD 202 from the available unassigned frequency channels. This selection process is similar to the process previously described in connection with step 240. When the SAS 204 determines that the CBSD 202 has downlink dominated traffic, the SAS 204 determines or measures the co-channel interference of the channels available for assignment and selects the available channel with the least amount of co-channel interference to be assigned to the CBSD 202 via an updated channel assignment. The SAS 204 for downlink dominated traffic CBSD does not determine adjacent channel interference or base the selection of the channel assignment for the CBSD on adjacent channel interference. When the SAS 204 determines that the CBSD 202 traffic is uplink dominated traffic, the SAS 204 determines and/or measures both the adjacent channel interference and the co-channel interference of the available channels. The SAS 204 then selects the channel with the least adjacent channel interference from among the available, i.e., unassigned, frequency channels to be assigned to CBSD 202 as an updated channel assignment. In some embodiments, after identifying the channel with the least adjacent channel interference, the SAS 204 also bases the channel selection on the co-channel interference such that the selected channel has the least adjacent channel interference but also has an acceptable co-channel interference level. When the SAS 204 determines that the CBSD 202's traffic is balanced downlink and uplink traffic, the SAS 204 determines and/or measures both the adjacent channel interference and the co-channel interference of the available channel. The SAS 204 then selects a channel with moderate co-channel and adjacent channel interference from among the available, i.e., unassigned, frequency channels, to be assigned to CBSD 202 as an updated channel assignment. The SAS 204 reserves the channels with the least co-channel interference for CBSDs with downlink dominated traffic and the channels with the least adjacent channel interference for the CBSDs with uplink dominated traffic. The SAS 204 in the process of selecting the new channel assignment attempts to improve upon the previous assignment by assigning a channel with an expectation of a lower average power headroom value or bit error rate over the next time period. Operation proceeds from step 260 to step 262.

In step 262, the SAS 204 generates updated channel assignment message 266 which includes the channel selected in step 260 based on the CBSD 202 traffic type determined by SAS 204 and/or the average uplink bit error rate and/or the average UE power headroom. The message 266 may, and in some embodiments does, also include a new time duration or time period for use in determining CBSD 202's traffic type. The message 266 may also include a request or command for the CBSD 202 to determine and report to the SAS 204 the average uplink bit error rate and/or average UE power headroom rate for a period of time, e.g., the time period received in message 220 or the updated time period included in the message 246 or 266. Operation proceeds from step 262 to step 264.

In step 264, the SAS 204 transmits the updated channel assignment message 266 to the CBSD 202. Operation proceeds from step 264 to step 268.

In step 268, the CBSD 202 receives and processes the updated CBSD channel assignment message 266. In some embodiments, the CBSD 202 stores the updated channel assignment and any other instructions or information in memory for future reference. Operation proceeds from step 268 to step 250 where the method continues as previously described with CBSD 202 implementing the channel change and begins using the updated channel identified in message 266 for communications with the UEs it is servicing. Also as previously described the CBSD 202 also re-starts the timer loaded with the time duration or period included in the message 266 or if no time period is included in the message 266 then with the time period included in the message 220 or 246. Until the timer expires at the end of the time period or duration, the CBSD 202 is operated to determine the type of traffic that CBSD 202 is servicing. If the message 266 also received a request, instruction or command to determine the average uplink bit error rate and/or the average UE power headroom, the CBSD 202 is also operated to determine the requested, instructed, or commanded average uplink bit error rate and average UE power headroom from information received from the UEs it is servicing during the specified time period. Once CBSD 202 completes the processing of step 250 operation proceeds from step 250 to step 252 as previously described and the method continues. In this way, the SAS 204 receives feedback from the CBSD 202, e.g., the average power headroom and average UE uplink bit error rate, with which the SAS 204 can evaluate its CBSD 202 channel assignments and improve on them in a way that provides for more efficient use of the limited spectrum available in the CBRS network.

In some embodiments of the method 200, the CBSD 202 bypasses the steps of measuring, generating and reporting the average uplink bit error rate and average UE power headroom value to the SAS 204 when the CBSD 202 prior traffic type determination is that the CBSD 202 was handling downlink dominated traffic or balanced uplink and downlink traffic saving expenditure of processing time and power at the CBSD 202. In some embodiments of the method 200, the CBSD 202 only measures, generates and reports the average uplink bit error rate and average UE power headroom value to the SAS 204 when the CBSD 202 prior traffic type determination is that the CBSD 202 was handling uplink dominated traffic.

In some embodiments, the SAS 204 makes the determination of whether to update the CBSD 202 channel selection also based on whether the CBSD 202 is requesting a change from its currently assigned channel. In such embodiments, when the CBSD 202 is requesting a change from its currently assigned channel the SAS 204 will make a determination as to whether a better channel selection for the CBSD 202 is available among the unassigned available channels and update the channel assigned to the CBSD 202 when the SAS 204 determines that a better unassigned channel is available. In some such embodiments, if the CBSD 202 does not request an updated channel assignment, the SAS 204 will not update the channel assignment for the CBSD 202 unless the SAS 204 determines that a new channel assignment is required as part of the SAS 204 normal management of the frequency spectrum of the CBRS network.

In some embodiments, the SAS 204 makes co-channel interference and adjacent channel interference determinations based not only on information provided by CBSDs registered with the SAS 204 but also on information provided by other Spectrum Access Systems managing other CBSDs other than the CBSDs registered with the SAS 204. In some embodiments, the co-channel interference and adjacent channel interference measurements/determinations are made by the CBSDs operating in the CBRS network, e.g., CBSD 1 102, CBSD 2 104, . . . , CBSD X 105 and CBSD M 198 in system 100 and reported to the SAS to which the CBSD is registered. For example, with respect to CBSD 1 102, CBSD 2 104, . . . , CBSD X 105, these CBSDs would measure the co-channel and adjacent channel interference they are experiencing and report this information to SAS 1 106. Similarly, CBSD M 198 would measure the co-channel and adjacent channel interference it was experiencing and report this information to the SAS 2 107. In such embodiments, the SAS 1 106 and SAS 2 107 would share the information or make it available to each of the SAS operating in the CBRS network, e.g., by uploading the interference information they received from the CBSDs to a centralized database accessible by all SAS operating in the CBRS network.

In some embodiments, the SAS 204 will also make the determination of whether a channel assignment should be updated for CBSD 202 on the timer period sine the last channel update wherein a time period threshold needs to be satisfied before a channel update will be performed so as to eliminate excessive channel updates and avoid excessive updates which can and sometime will detrimentally affect the channel interference other CBSDs are experiencing and/or the quality of service being provided to UEs. The time period between channel updates can also be used to ensure stability in the network with respect to frequency spectrum allocation by the SAS 204.

Figure 3:
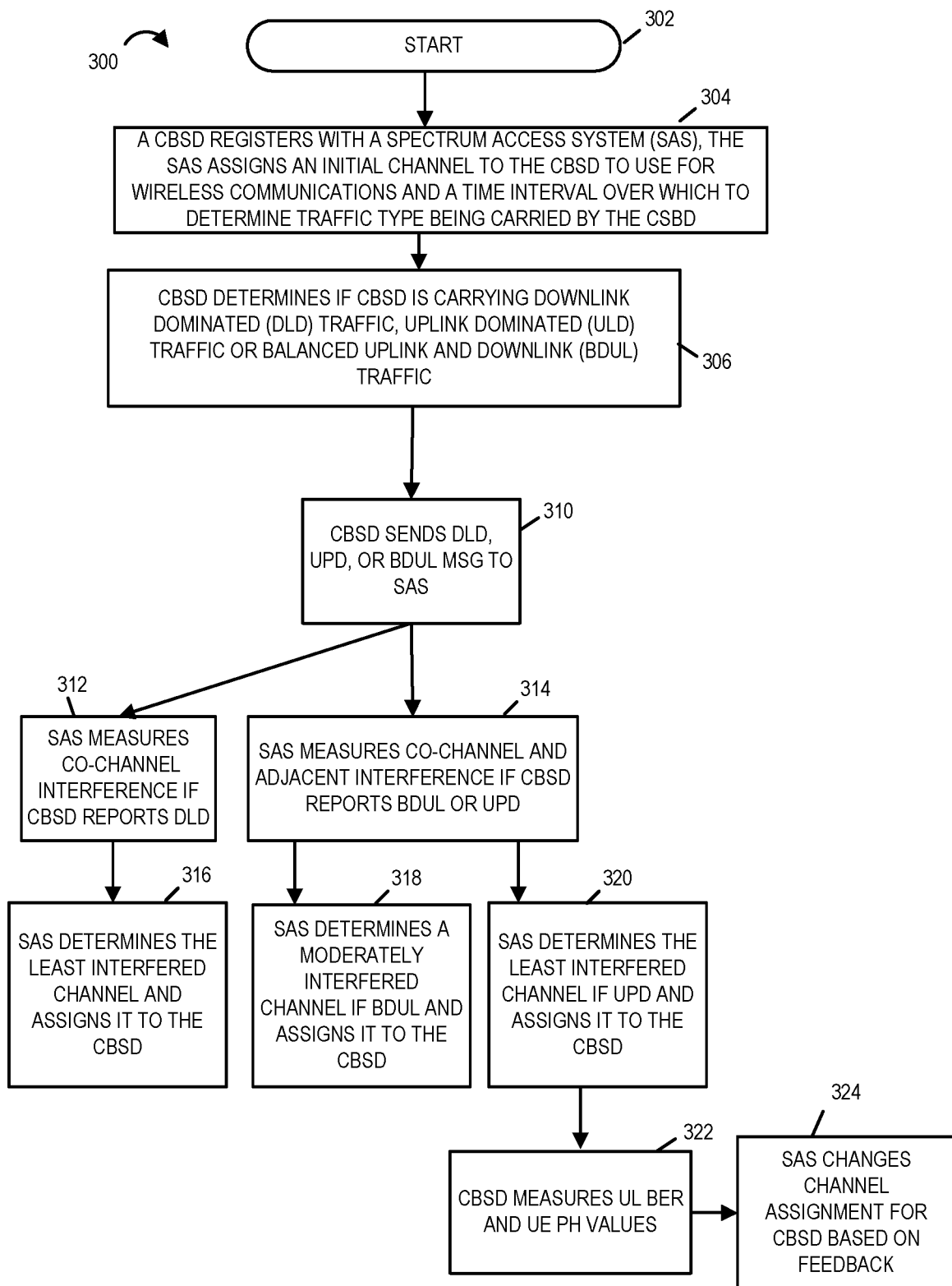
FIG. 3 illustrates a flowchart of another exemplary method in accordance with one embodiment of the present invention.

FIG. 3 illustrates a flowchart of another exemplary method 300 in accordance with an embodiment of the present invention. For explanatory purposes the exemplary method 300 will be explained in connection with the exemplary CBRS network system 100 illustrated in FIG. 1 although it should be understand that the method may be implemented using other systems and other system configurations then those illustrated in FIG. 1.

The method 300 shown in FIG. 3 will now be discussed in detail. The method starts in start step 302 shown on FIG. 3 with the devices in system 100 being initialized and becoming operational. Operation proceeds from start step 302 to step 304.

In step 304, a CBSD, e.g., CBSD 1 102 of system 100, registers with a Spectrum Access System, SAS 1 106 of system 100. For example, the CBSD sends a registration request to the SAS which receives the registration request. The SAS registers the CBSD at the SAS in response to the registration request of the CBSD. The SAS upon registering the CBSD selects an initial frequency spectrum channel assignment for the CBSD from the plurality of available frequency spectrum channels, e.g., based on a location of the CBSD and co-channel interference. In some embodiments, the CBSD provides its location when registering. The SAS assign the selected initial frequency spectrum channel to the CBSD. The SAS then communicates, e.g., transmits, information identifying the assigned initial frequency spectrum channel to the CBSD, e.g., a channel identifier. In some embodiments, the channel identifier is a numerical channel identifier. The SAS also communicates, e.g., transmits a time interval defining an amount of time during which the CBSD is to determine the type of traffic being carried by the CBSD. In some embodiments, the registration request includes a frequency spectrum allocation or channel request. In some embodiments, a separate frequency spectrum allocation or channel request is made in addition to the registration request. In some embodiments, the SAS selects and assigns the initial channel to the CBSD in response to a frequency spectrum allocation or channel assignment request. The channel assigned by the SAS to the CBSD is used for both uplink and downlink traffic. The SAS channel assignments are typically a set or band of contiguous frequencies, e.g., a 10 MHz band of frequencies from 3550-3700 MHz frequency band. Operation proceeds from step 304 to step 306.

In step 306, the CBSD determines the type of traffic it is carrying during the time interval specified by the SAS. The type of traffic being chosen from the following traffic types: downlink dominated traffic (DLD), uplink dominated traffic (UPD), or balanced downlink and uplink traffic (BDUL). In some embodiments, the CBSD will determine if it is serving or carrying uplink dominated traffic, downlink dominated traffic, or balanced uplink and downlink dominated traffic by measuring the amount of downlink and uplink physical resource blocks (PRBs) used by the CBSD to communicate with the UEs the CBSD is serving. This measurement or determination is performed based on the particular time interval or period which was communicated to the CBSD from the SAS during the initial SAS communication during the registration phase or during attachment by the CBSD to the SAS. In some embodiments, the determination of the type of traffic that the CBSD is carrying is based on two threshold a lower threshold and an upper threshold. If the percentage of measured downlink traffic to the overall measured traffic is less than the lower threshold then the CBSD determines that it is carrying uplink dominated traffic. If the percentage of the measured downlink traffic to the overall measured traffic is greater than the upper threshold then the CBSD determines that it is carrying downlink dominated traffic. If the percentage of the measured downlink traffic to the overall measured traffic is equal to or greater than the lower threshold and less than or equal to the upper threshold than the CBSD determines that it is carrying balanced downlink and uplink traffic. For example, the lower threshold may be 20% and the upper threshold 80%. When greater than 80% of the traffic is downlink traffic, the CBSD determines that it is carrying downlink dominated traffic. When less than 20% of the traffic is downlink traffic then the CBSD determines it is carrying uplink dominated traffic. When the percentage of the overall uplink and downlink traffic 20% or greater and 80% or less, the CBSD determines that it is carrying balanced downlink and uplink traffic. While the values for the lower and upper thresholds are exemplary. Operation proceeds from step 306 to step 310.

In step 310, after the expiration of the time period or interval, the CBSD communicates or sends a message to the SAS which includes an indication of the traffic type the CBSD determined it was carrying, e.g., downlink dominated traffic, uplink dominated traffic or balanced uplink and downlink dominated traffic. The SAS receives the message indicating the type of traffic being carried by the CBSD over the specified time interval. Operation proceeds from step 310 to step 312 and 314.

In step 312, if the CBSD message reporting its traffic type indicated that the CBSD was carrying downlink dominated traffic the SAS measures the co-channel interference for the channels available for assignment and determines the channel which has the least co-channel interference. In some embodiments, the SAS only measures the co-channel interference when the CBSD reports it is carrying downlink dominated traffic. That is it does not measure adjacent channel interference. In most embodiments, the CBSD measures and/or determines the co-channel interference using information reported by CBSDs to which channels have been assigned and are actively being used. Operation proceeds from step 312 to step 316.

In step 316, the SAS assigns the channel(s) which it determined had the least co-channel interference to the CBSD thereby updating the CBSD channel assignment. Once the SAS has assigned the determined or selected channel to the CBSD it communicates the channel assignment to the CBSD which begins using the channel for communications with the UEs it is servicing.

In step 314, the SAS measures co-channel interference and adjacent channel interference for the channels available for assignment if the CBSD reports balanced downlink and uplink traffic or uplink dominated traffic. When the SAS determines that the CBSD reported in the message sent in step 310 that the CBSD is carrying balanced downlink and uplink traffic, operation proceeds from step 314 to step 318. When the SAS determines that the CBSD reported in the message sent in step 310 that the CBSD is carrying uplink dominated traffic operation proceeds from step 314 to step 320.

In step 320, the SAS determines the least interfered channel from the channels available for assignment based on measured adjacent channel and co-channel interference. The SAS then assigns the channel with the least interference to the CBSD thereby updating the CBSD channel assignment. In some embodiments, the selects the channel with the least adjacent channel interference from among the channels available for assignment to a CBSD and assigns it to the CBSD. In some such embodiments, the CBSD also checks that the selected channel with the least adjacent channel interference also has a measured co-channel interference less than a co-channel interference threshold. The co-channel interference threshold being set at a level in the co-channel interference will not prevent communications on the selected channel between the CBSD and the UEs it is serving. Once the SAS has assigned the selected channel to the CBSD it communicates the channel assignment to the CBSD which begins using the channel for communications with the UEs it is servicing. Operation proceeds from step 320 to step 322.

In step 322, the CBSD will measure and report the average uplink bit error rate and/or UE power headroom values, e.g., average UE power headroom generated from UE power headroom information provided by the UEs being serviced by the CBSD to the CBSD, back to the SAS. That is the CBSD sends or transmits the measured average uplink bit error rate and/or UE power headroom value to the SAS. In some embodiments, the CBSD measures the average uplink bit error rate and/or the UE power headroom value over a time period or interval specified by the SAS such as for example the time interval (e.g., 1 week) which transmitted to the CBSD during the registration or attachment phase. In some embodiments, the CBSD also determines the type of traffic it carrying during the time interval and also reports this information to the SAS in case the CBSD's traffic type has changed. Operation proceeds from step 322 to step 324.

In step 324, the SAS receives the message including information reporting the average uplink bit error rate and/or the UE power headroom values sent by the CBSD. Based on the uplink bit error rate and/or the UE power headroom values, the SAS evaluates the accuracy of its co-channel interference and adjacent channel interference measurements and channel selection and assignment which was performed in steps 318 and 320. The SAS uses the evaluation results to improve its next channel assignment to the CBSD by assigning a better channel with an expectation of lower average power headroom and bit error rate (BER) values. After the channel assignment is updated and sent to the CBSD, the CBSD begins communicating with the UEs it is servicing using the updated channel assignment with operation of the method continuing and the CBSD continuing to measure and report average uplink bit error rate and power headroom values back to the SAS and the SAS evaluating and updating the channel assignment.

In step 318, the SAS finds the channels available for assignment with moderate co-channel interference and adjacent channel interference. Because the SAS reserves the channel with the least co-channel interference to assign to a CBSD with downlink dominated traffic and the channel with the least adjacent channel interference to a CBSD with uplink dominated traffic, the CBSD selects a channel with moderate co-channel interference and adjacent channel interference from among the channels available for assignment. The SAS assigns the selected channel to the CBSD thereby updating the CBSD channel assignment. Once the SAS has assigned the selected channel to the CBSD it communicates the channel assignment to the CBSD which begins using the channel for communications with the UEs it is servicing. In some embodiments, to determine if a channel has moderate co-channel interference, the SAS compares the co-channel interference to a lower co-channel interference threshold and an upper co-channel interference threshold and identifies channels having a co-channel interference between the lower co-channel threshold and the upper co-channel interference threshold as channels have moderate co-channel interference. In some embodiments, to determine if a channel has moderate adjacent channel interference, the SAS compares the adjacent channel interference to a lower adjacent channel interference threshold and an upper adjacent channel interference threshold and identifies channels having a co-channel interference between the lower adjacent channel threshold and the upper adjacent channel interference threshold as channels with moderate adjacent channel interference.

Figure 10:
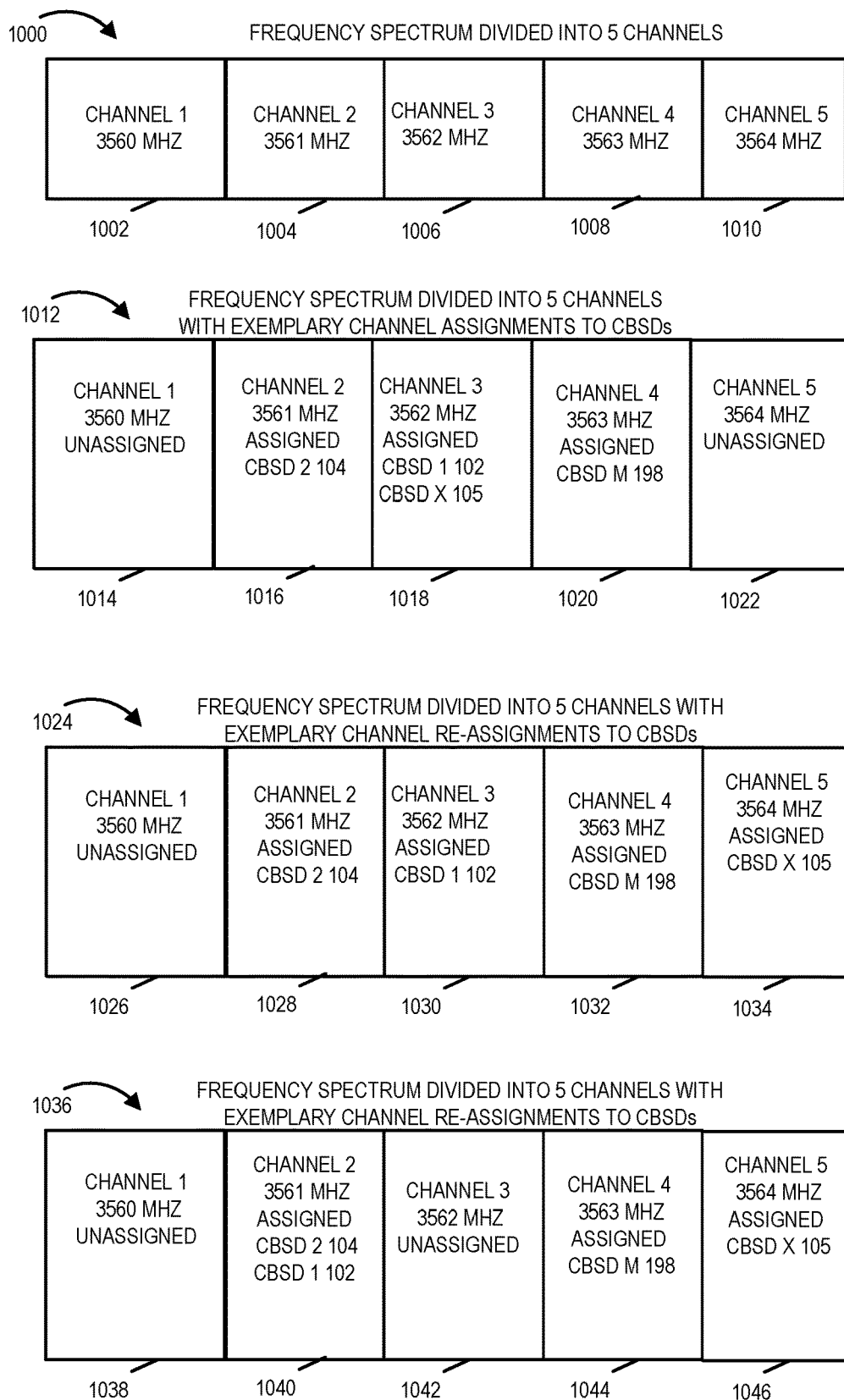
FIG. 10 illustrates exemplary frequency spectrum channel allocations in a Citizens Broadband Radio Service network.

FIG. 10 illustrates exemplary frequency spectrum channel allocations in a Citizens Broadband Radio Service network. Diagram 1000 illustrates how the frequency spectrum may be divided among 5 channels. For simplicity the frequency channels are represented as single frequencies. In most systems the frequency channel while be a contiguous band of frequencies, e.g., 10 MHz band, of frequencies. In diagram 1000 of FIG. 10, channel 1 1002 is 3560 MHz, channel 2 1004 is 3561 MHz, channel 3 1006 is 3562 MHz, channel 4 1008 is 3563 MHz and channel 5 1110 is 3564 MHz.

Diagram 1012 illustrates exemplary channel assignments to CBSDs of system 100 of FIG. 1. Channel 1 1014 (3560 MHz) is unassigned. Channel 2 1016 (3561 MHz) is assigned to CBSD 2 104 of system 100. Channel 3 1018 (3562 MHz) is assigned to both CBSD 1 102 and CBSD X 105. Channel 4 1020 (3564 MHz) is assigned to CBSD M 198. Channel 5 1022 (3564 MHz) is unassigned. Because CBSD 1 102 and CBSD X 105 have been assigned the same frequency channel (3562 MHz) these CBSDs, may experience co-channel interference as both CBSD 1 102 and CBSD X 105 are using the same frequency 3562 to communicate with the UEs they are serving. The amount of co-channel interference will depend at least in part on how far apart they are geographically and the strength (transmit power level) of the communication signals being exchanged between the CBSDs and the UEs they are serving. In addition to co-channel interference, the CSBD 1 102 and CBSD X 105 can also experience adjacent channel interference from the signal transmissions between CBSD 2 104 and the UEs it is serving using channel 2 3561 MHz and from the signal transmissions between CBSD M 198 and the UEs it is serving using channel 5 3564 MHz.

Diagram 1024 of FIG. 10 illustrates a channel re-assignment to the CBSDs of system 100 in accordance with an exemplary embodiment of the present invention. In the exemplary channel re-assignment, CBSD X 105 has reported to SAS 1 106 that it is carrying downlink dominated traffic. The SAS 1 106 after measuring co-channel interference of the channels available for re-assignment selects channel 5 3564 MHz and assigns it to CBSD X 105. As no other CBSDs are operating on channel 5 or channel 1 both are the channels with least co-channel interference. In this example, the SAS 1 106 selected channel 5 to be assigned to CBSD X 105. The channel assignments for diagram 1024 then become channel 1 1026 unassigned, channel 2 assigned CBSD 2 104 1028, channel 3 assigned CBSD 1 102 1030, channel 4 assigned CBSD M 198 1032, and channel 5 assigned CBSD X 105 1034.

Diagram 1036 of FIG. 10 illustrates a channel re-assignment to the CBSDs of system 100 in accordance with an exemplary embodiment of the present invention. In the exemplary channel re-assignment, CBSD 1 102 has reported to SAS 1 106 that it is carrying uplink dominated traffic. The SAS 1 106 after measuring co-channel interference and adjacent channel interference of the channels available for re-assignment selects channel 2 3561 MHz and assigns it to CBSD 1 102. As no other CBSDs are operating in channel 1 3560 MHz at the frequency below channel 2 or in channel 3 at 3562 MHz the frequency above channel after the re-assignment channel 2 3561 MHz is the channel with the least adjacent channel interference. In this example, the SAS 1 106 selects channel 2 to be assigned to CBSD 1 102. The channel assignments for diagram 1036 then become channel 1 1038 unassigned, channel 2 assigned to CBSD 2 104 and CBSD 1 102 1040, channel 3 unassigned 1042, channel 4 assigned CBSD M 198 1044, and channel 5 assigned CBSD X 105 1046.

Figure 4:
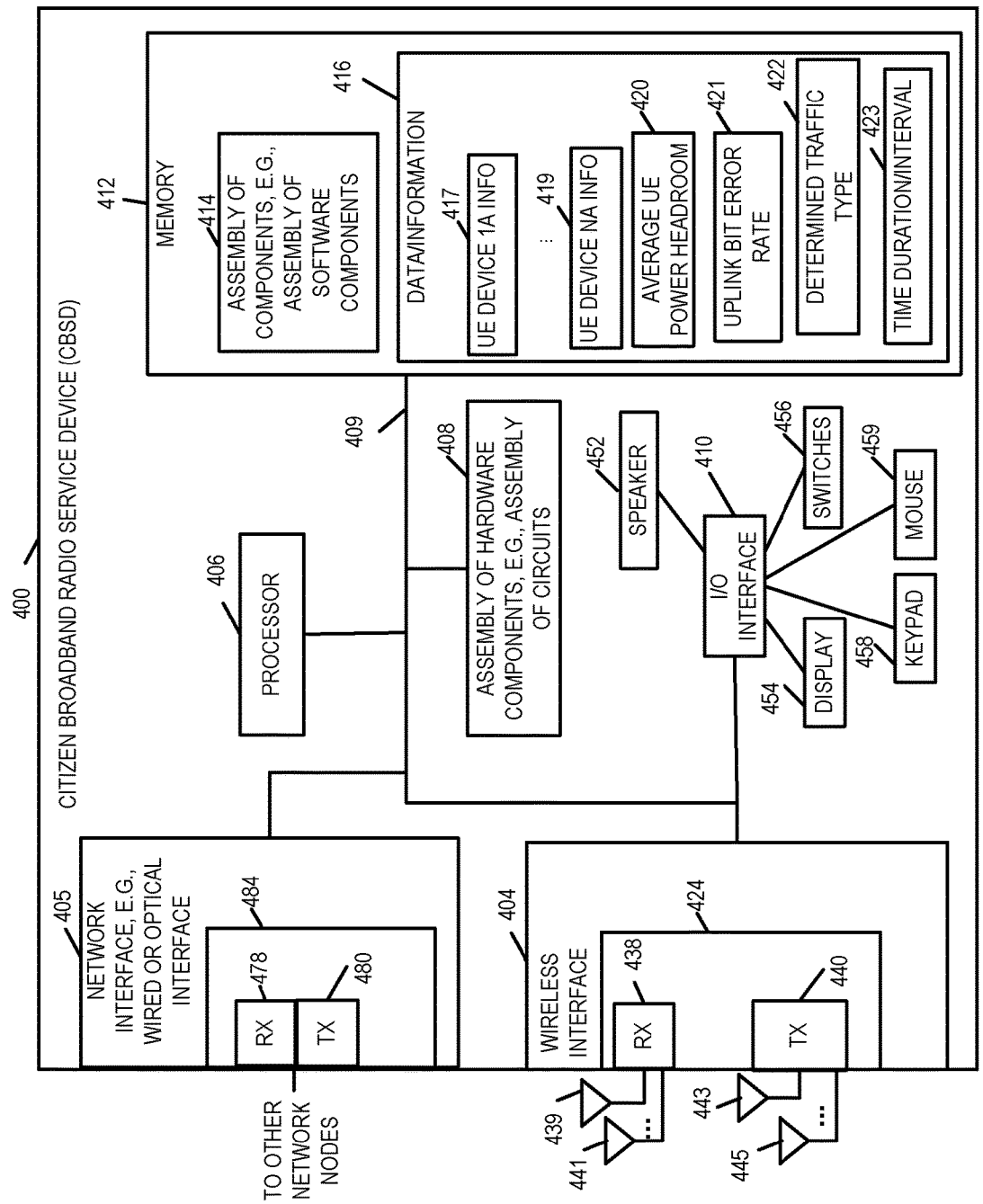
FIG. 4 illustrates details of an exemplary Citizens Broadband Radio Service Device (CBSD) in accordance with one embodiment of the present invention.

FIG. 4 is a drawing of an exemplary Citizens Broadband Radio Service Device (CBSD) 400 in accordance with an exemplary embodiment. The CBSD device 400, in some embodiments, incorporates Long Term Evolution (LTE), e.g., 4G LTE, eNodeB base station/access point capabilities such as determination of a user equipment device's power headroom values, average power headroom value, and average UE uplink bit error rate from signals received from user equipment devices being serviced by the CBSD. The CBSD device 400 also includes the capabilities of a CBSD as defined by the Federal Communications Commission's Rules with Regard to Commercial Operations in the 3550-3650 MHz Band. Exemplary CBSD device 400 includes a wireless interface 404, a network interface 405, e.g., a wired or optical interface, a processor 406, e.g., a CPU, an assembly of hardware components 408, e.g., an assembly of circuits, and I/O interface 410 and memory 412 coupled together via a bus 409 over which the various elements may interchange data and information. CBSD device 400 further includes a speaker 452, a display 454, switches 456, keypad 458 and mouse 459 coupled to I/O interface 410, via which the various I/O devices (452, 454, 456, 458, 459) may communicate with other elements (404, 405, 406, 408, 412) of the CBSD device 400. Network interface 405 includes a receiver 478 and a transmitter 480. In some embodiments, receiver 478 and transmitter 480 are part of a transceiver 484. Wireless interface 404 includes a wireless receiver 438 and a wireless transmitter 440. In some embodiments, receiver 438 and transmitter 440 are part of a transceiver 4242. In various embodiments, wireless interface 404 includes a plurality of wireless receivers and a plurality of wireless transmitters. Wireless receiver 438 is coupled to a plurality of receive antennas (receive antenna 1 439, . . . , receive antenna M 441), via which CBSD device 400 can receive wireless signals from other wireless communications devices including a second wireless communications device, e.g., a UE device. Wireless transmitter 440 is coupled to a plurality of wireless transmit antennas (transmit antenna 1 443, . . . , transmit antenna N 445) via which the CBSD 400 can transmit signals to other wireless communications devices including a second wireless communications device, e.g., a UE device. Memory 412 includes an assembly of components 414, e.g., an assembly of software components, and data/information 416. Data/information 416 includes UE device information corresponding to a plurality of user equipment devices (UE device 1A information 417, . . . , UE device N information 419 where 1A to NA are the UE devices being serviced by the CBSD, for example CBSD 1, 102 UE 1A 110 . . . UE NA 119 as shown in FIG. 1 including e.g., average UE power headroom value 420, average uplink bit error rate 421, CBSD determined traffic type 422, time duration/interval for determining traffic type and other perform other measurements, e.g., average UE power headroom, average uplink bit error rate. The CBDS data/information may also include the assigned frequency spectrum channel and/or channel identifier, various threshold values, e.g., uplink and downlink dominated traffic threshold values to be used for determining the type of traffic the CBSD is carrying, measurement of PRBs used in uplink communications and downlink communications by the CBSD. In some embodiments, the CBSD(s) of the systems and methods disclosed herein are implemented in accordance with CBSD 400. In some embodiments, CBSD 1 102 and/or CBSD 2 104, . . . , CBSD X 104, CBSD M 198 are implemented in accordance with CBSD 400. In some embodiments, CSBD 202 is implemented in accordance with CBSD 400.

Figure 5:
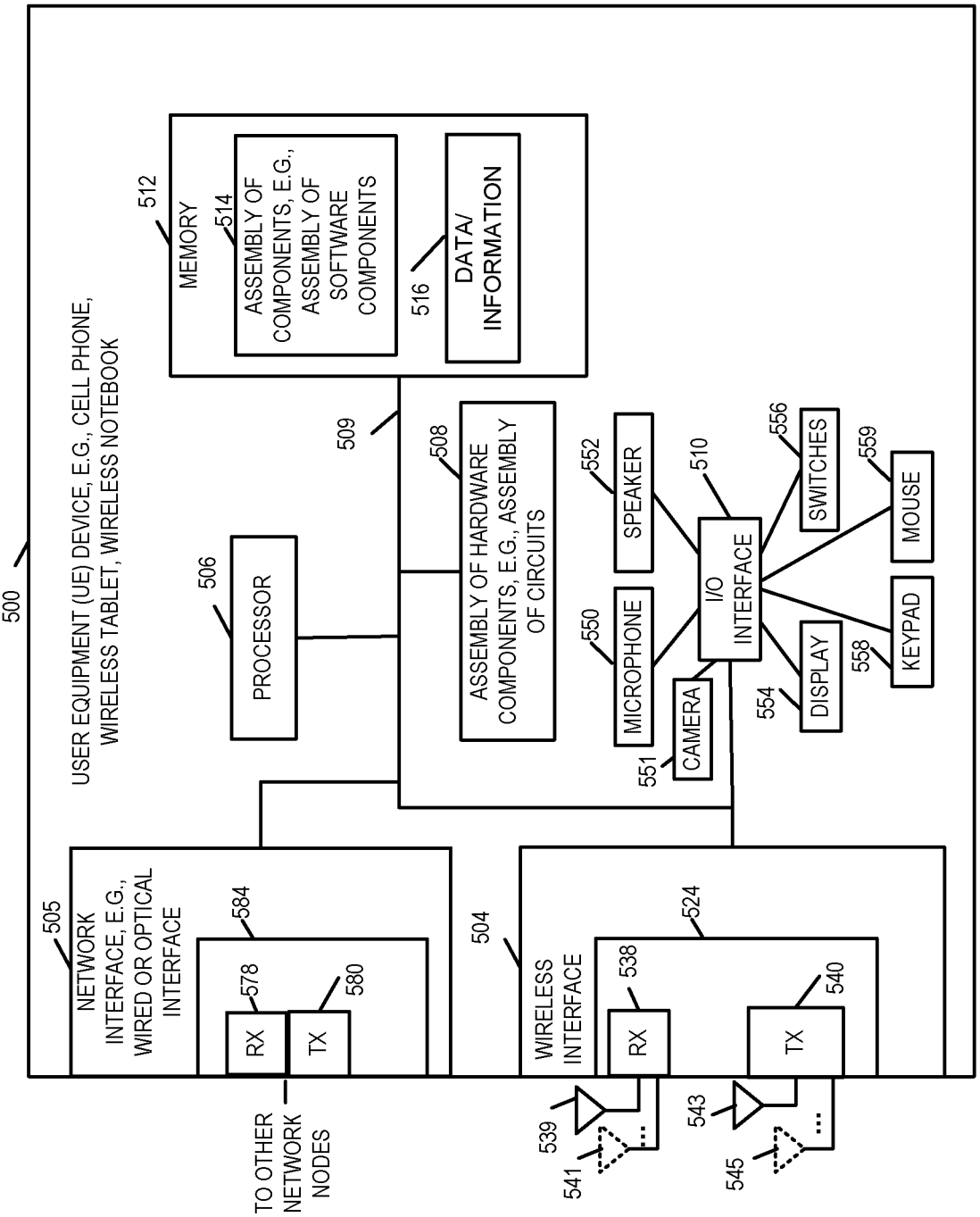
FIG. 5 illustrates details of an exemplary User Equipment (UE) device in accordance with one embodiment of the present invention.

FIG. 5 is a drawing of an exemplary user equipment (UE) device 500 in accordance with an exemplary embodiment. UE device 500 is, e.g., a mobile device such as a cell phone, a smart phone, wireless tablet, wireless notebook, drone with wireless communications, laptop. UE device 500, in some embodiments, includes Long Term Evolution (LTE), e.g., 4G LTE, mobile device capabilities such as for example generating and sending to a base station, e.g., CBSD, power headroom values, channel quality indicator values, and demodulated reference signals. Exemplary UE device 500 includes a wireless interface 504, a processor 506, e.g., a CPU, an assembly of hardware components 508, e.g., an assembly of circuits, and I/O interface 510 and memory 512 coupled together via a bus 509 over which the various elements may interchange data and information. UE device 500 further includes a microphone 550, camera 551, speaker 552, a display 554, e.g., a touch screen display, switches 556, keypad 558 and mouse 559 coupled to I/O interface 510, via which the various I/O devices (550, 551, 552, 554, 556, 558, 559) may communicate with other elements (504, 505, 506, 508, 512) of the UE device. Network interface 505 includes a receiver 578 and a transmitter 580. In some embodiments, receiver 578 and transmitter 580 are part of a transceiver 584. Wireless interface 504 includes a wireless receiver 538 and a wireless transmitter 540. In some embodiments, receiver 538 and transmitter 540 are part of a transceiver 524. In various embodiments, wireless interface 504 includes a plurality of wireless receivers and a plurality of wireless transmitters. Wireless receiver 538 is coupled to one or more receive antennas (receive antenna 1 539, . . . , receive antenna M 541), via which UE device 500 can receive wireless signals from other wireless communications devices including, e.g., a CBSD device such as CBSD 400. Wireless transmitter 540 is coupled to one or more wireless transmit antennas (transmit antenna 1 543, . . . , transmit antenna N 545) via which the UE device 500 can transmit signals to other wireless communications device including a first wireless communications device, e.g., a CBSD 400. Memory 512 includes an assembly of components 514, e.g., an assembly of software components, and data/information 516. The UE devices in system 100 may be, and in some embodiments are, implemented in accordance with the user equipment device 500. The UE devices described in connection with various embodiments of the present invention may be, and in some embodiments are, implemented in accordance with UE device 500.

Figure 6:
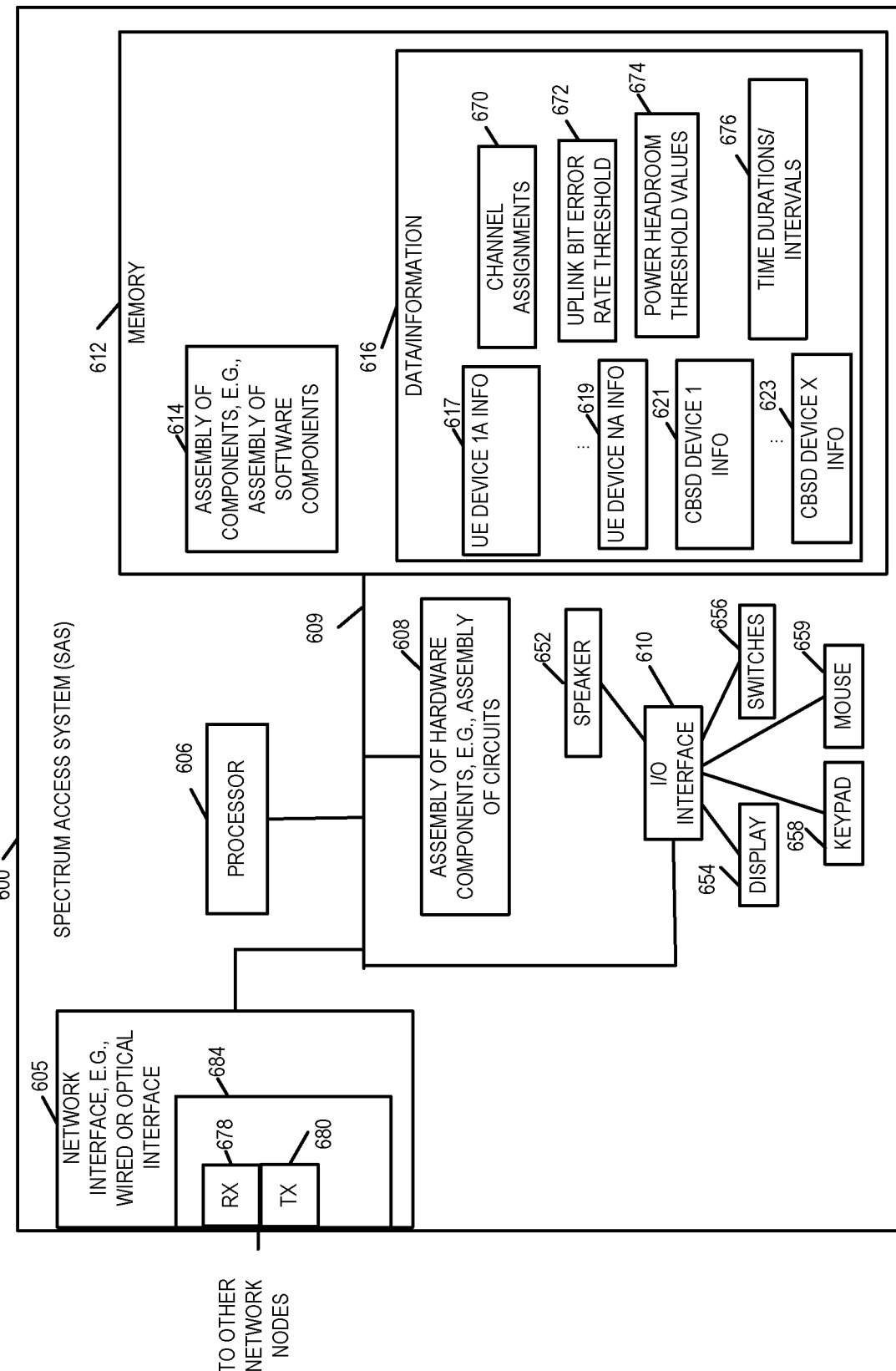
FIG. 6 illustrates details of an exemplary Spectrum Access System device (SAS) in accordance with one embodiment of the present invention.

FIG. 6 is a drawing of an exemplary Spectrum Access System (SAS) device 600 in accordance with an exemplary embodiment. The SAS 600 includes the capabilities of a SAS as defined by the Federal Communications Commission's Rules with Regard to Commercial Operations in the 3550-3650 MHz Band. Exemplary SAS device 600 includes a network interface 605, e.g., a wired or optical interface, a processor 606, e.g., a CPU, an assembly of hardware components 608, e.g., an assembly of circuits, and I/O interface 610 and memory 612 coupled together via a bus 609 over which the various elements may interchange data and information. SAS 600 further includes a speaker 652, a display 654, switches 656, keypad 658 and mouse 659 coupled to I/O interface 610, via which the various I/O devices (652, 654, 656, 658, 659) may communicate with other elements (605, 606, 608, 612) of the SAS 600. Network interface 605 includes a receiver 678 and a transmitter 680. The network interface 605 is typically used to communicate with other SAS devices and CBSD devices. In some embodiments, receiver 678 and transmitter 680 are part of a transceiver 684. Memory 612 includes an assembly of component 614, e.g., an assembly of software components, and data/information 616. Data/information 616 includes UE device information corresponding to a plurality of UE devices (UE device 1A information 617 . . . UE device NA information 619, where N is integer number. Data/information 616 also includes CBSD device information corresponding to a plurality of CBSD devices (CBSD device 1 information 621, . . . , CBSD device X information 623, where X is an integer number). Exemplary CBSD device information includes, among other things, frequency spectrum channel assigned to CBSD, determined traffic type being carried by the CBSD, average UE power headroom, average uplink bit error rate. Data/Information 616 also includes channel assignments 670 including information on available frequency spectrum channels and unavailable and/or assigned frequency spectrum channels included measured co-channel and adjacent channel interference on each of the channels. The data/information 616 further includes uplink bit error rate threshold value 672, UE power headroom threshold value(s) 674, time intervals/durations 676 for use by CBSDs to determine traffic type being carried by the CBSD, CBSD's average uplink bit error rate, average UE power headroom. The data/information 616 may also include CBDS device transmission power and additional spectrum allocation information. The SAS devices described in connection with the various embodiments may be, and in some embodiments are, implemented in accordance with SAS 600. In some embodiments, SAS 1 106 and SAS 2 108 are implemented in accordance with SAS 600. In some embodiments SAS 204 is implemented in accordance with SAS 600.

Figure 7:
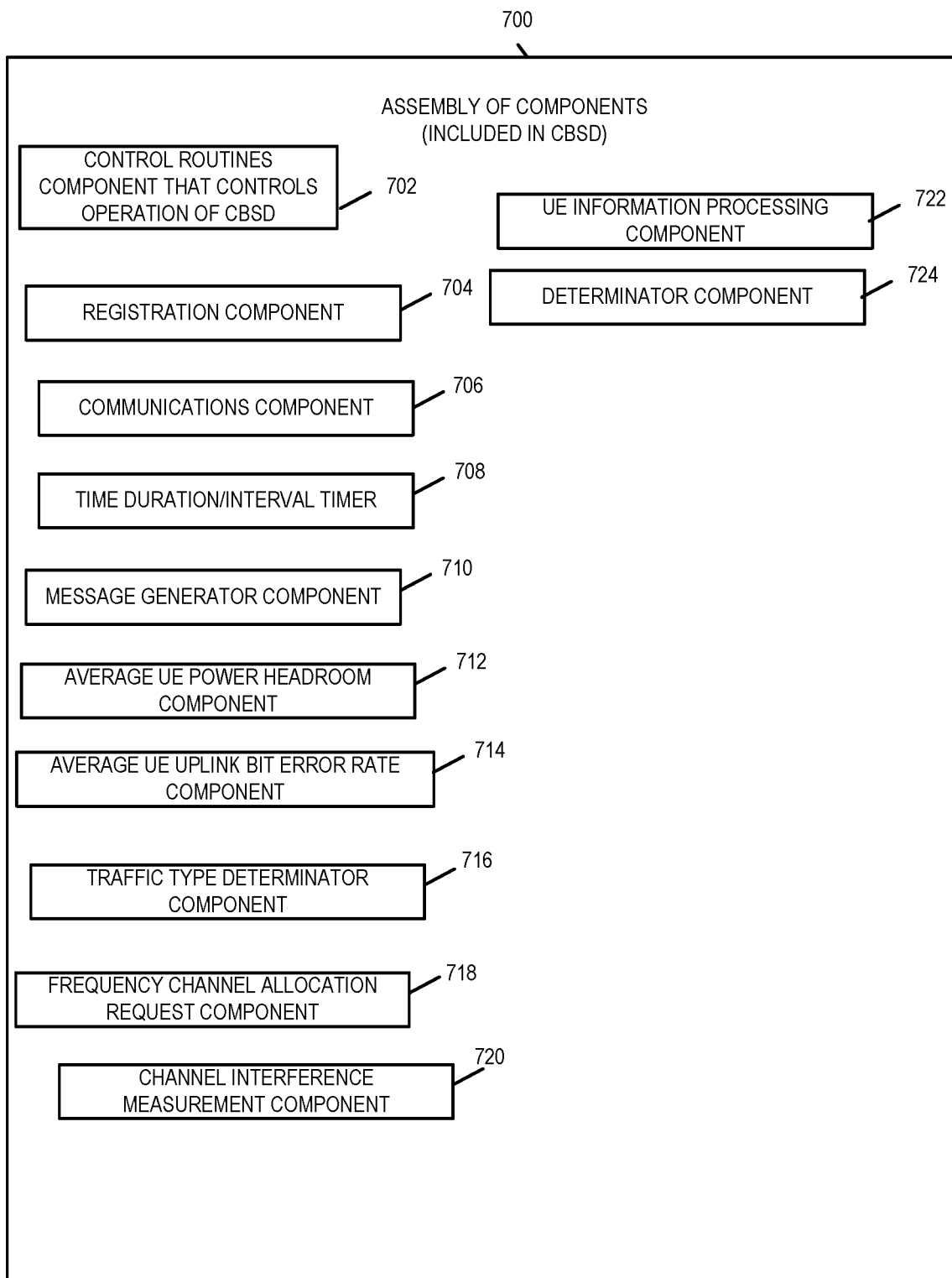
FIG. 7 illustrates an exemplary assembly of components for a CBSD in accordance with an embodiment of the present invention.

FIG. 7 is a drawing of an exemplary assembly of components 700 which may be included in an exemplary CBSD device, e.g., exemplary CBSD 400 of FIG. 4, in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the CBSD device 400, with the components controlling operation of CBSD device 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the CBSD device 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method.

Assembly of components 700 includes a control routines component 702, a registration component 704, a communications component 706, a time duration/interval timer component 708, a message generator component 710, an average power headroom value determinator component 712, an average uplink bit error rate determinator component 714, a traffic type determinator component 716, a frequency channel allocation request component 718, a channel interference measurement component 720, a UE information processing component 722, determinator component 724.

The control routines component 702 is configured to control operation of the CBSD. The registration component 704 is configured to register the CBSD with a Spectrum Access System. The communication component 706 is configured to handle communications, e.g., transmission, reception, and processing of messages, and protocol signaling for the CBSD. The time duration/interval timer component 708 is configured to work as a timer that can used to measure the amount of time during which an activity such as measurement of the average uplink bit error rates or average UE power headroom is performed. For example, the timer component 708 can be loaded with the time interval provided by the SAS at the start of data collection and trigger the end of data collection once the loaded time interval has expired. The message generator component 710 is configured to generate messages for transmission to other devices. The average UE power headroom value determinator component 712 is configured to determine an average UE power headroom value by averaging the powerhead values received by the CBSD from UEs the CBSD is servicing during a specified time interval. The average uplink bit error rate determinator component 714 is configured to determine the average uplink bit error rate over a specified time interval. The traffic type determinator component 716 is configured to determine the type of traffic the CBSD is carrying, e.g., downlink dominated traffic, uplink dominated traffic or balanced uplink and downlink dominated traffic. The frequency channel allocation request component 718 is configured to generate a frequency channel allocation request to be sent to an SAS, e.g., an initial channel allocation request in which an initial frequency spectrum channel allocation is requested to be assigned to the CBSD for use in uplink and downlink wireless communications or an update channel allocation in which a replacement channel is requested for the channel currently assigned to the CBSD. The channel interference measurement component 720 performs measurements for interference on the assigned channel for example, co-channel interference measurements and adjacent channel interference measurements and provides this measurements to the SAS controlling the CBSD. The UE information processing component 722 processes UE information received from UE devices, e.g., power headroom values. The determinator component 724 is configured to make determinations and/or decisions for the CBSD for example based on received information and/or generated information.

Figure 8:
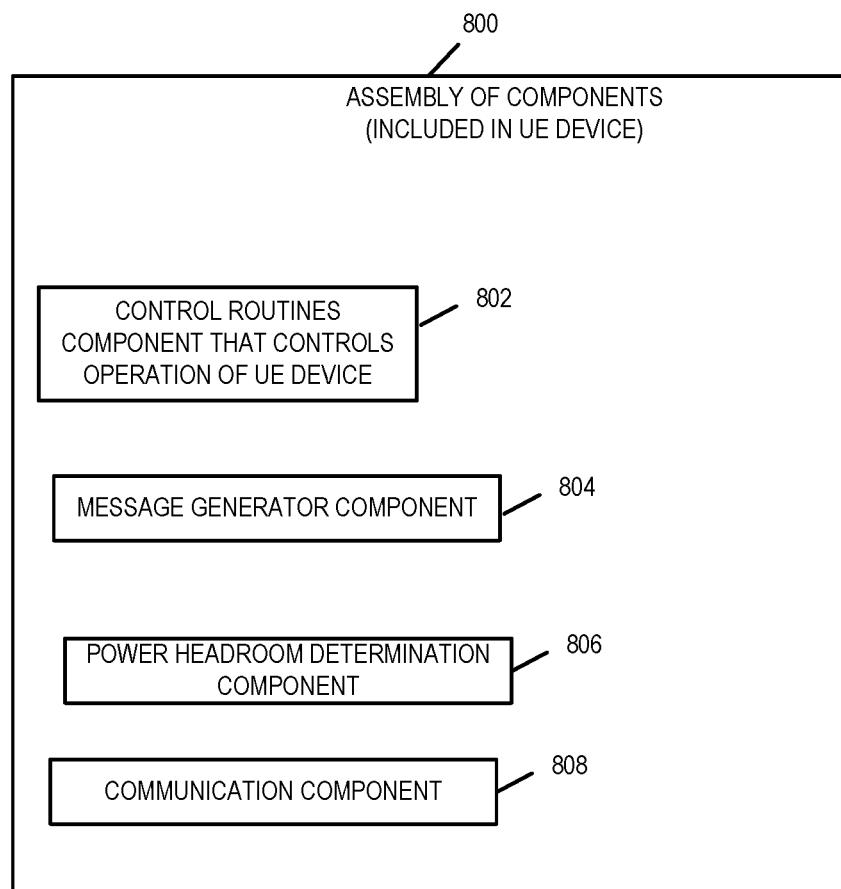
FIG. 8 illustrates an exemplary assembly of components for a user equipment device in accordance with an embodiment of the present invention.

FIG. 8 is a drawing of an exemplary assembly of components 800 which may be included in an exemplary user equipment (UE) device, e.g., UE device 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the UE device 500, with the components controlling operation of UE device 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE device 500 or elements therein such as the processor 506, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a control routines component 802, a message generator component 804, a power headroom determination component 806, a communication component 808. The control routines component 802 is configured to control operation of the UE. The message generator component 804 is configured to generate messages for transmission to CBSD devices. The power headroom determination component 806 is configured to determine or generate a power headroom value for the user equipment device, e.g., to provide to the CBSD device servicing the UE. The communication component 808 is configured to handle communications, e.g., receipt, transmission and processing of signals and provide protocol signal processing for one or more protocols for the UE.

Figure 9:
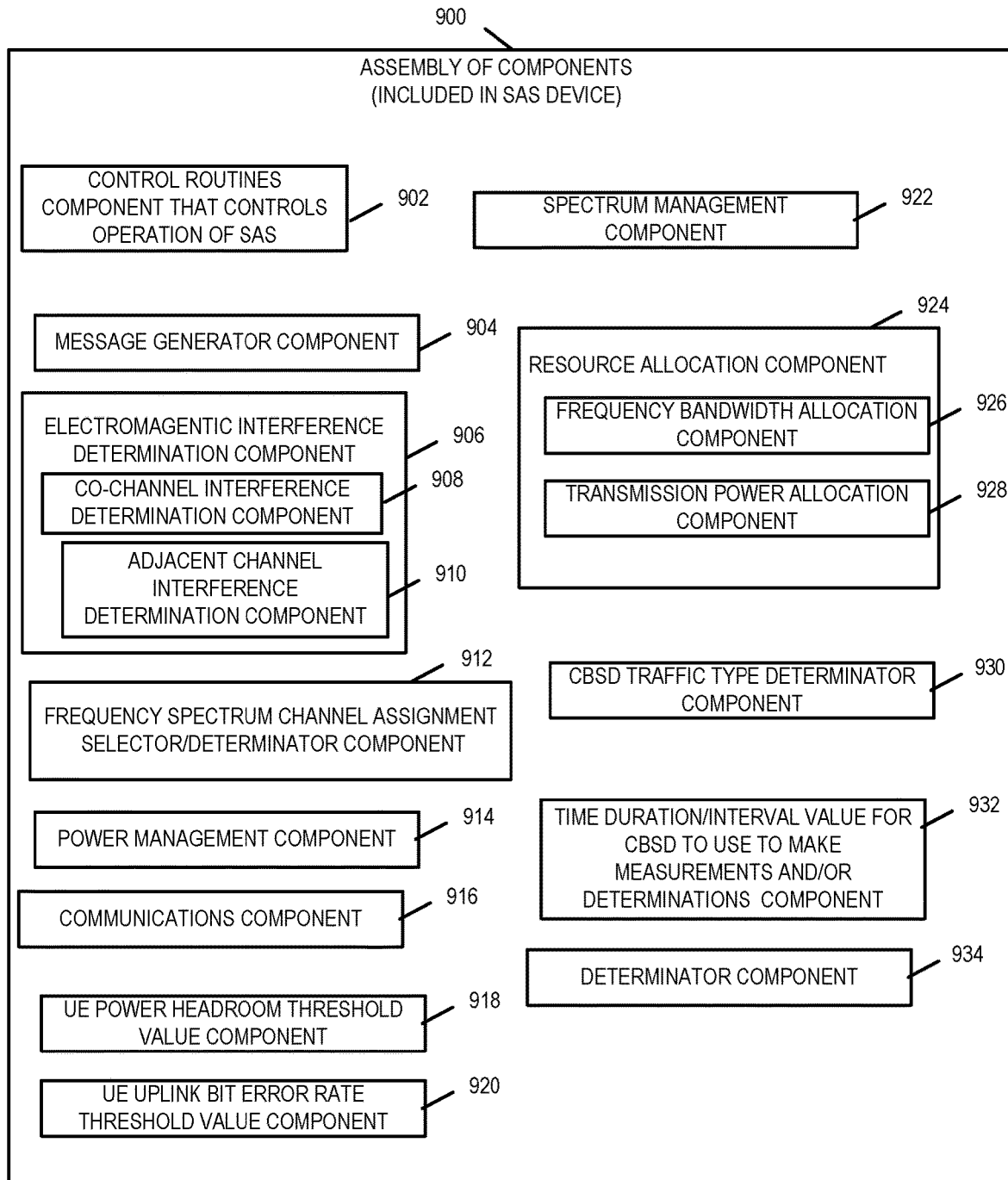
FIG. 9 illustrates an exemplary assembly of components for a SAS device in accordance with an embodiment of the present invention.

FIG. 9 is a drawing of an exemplary assembly of components 900 which may be included in an exemplary SAS device, e.g., exemplary SAS 600 of FIG. 6, in accordance with an exemplary embodiment. The components in the assembly of components 900 can, and in some embodiments are, implemented fully in hardware within a processor, e.g., processor 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor 606 with other components being implemented, e.g., as circuits within assembly of components 608, external to and coupled to the processor 606. As should be appreciated the level of integration of components on the processor and/or with some components being external to the processor may be one of design choice. Alternatively, rather than being implemented as circuits, all or some of the components may be implemented in software and stored in the memory 612 of the SAS 600, with the components controlling operation of SAS 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor, e.g., processor 606, configure the processor to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the SAS 600 or elements therein such as the processor 606, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

Assembly of components 900 includes a control routines component 902, a message generator component 904, an electromagnetic interference determination component 906, a frequency spectrum channel assignment selector/determinator component 912, a power management component 914, a communications component 916, an UE power headroom threshold value component 918, an UE bit error rate threshold value component 920, a spectrum management component 922, a resource allocation component 924, a CBSD traffic type determinator component 930, a time duration/interval value for CBSD to make measurements and/or determinations component 932 and a determinator component 934. The electromagnetic interference determination component 960 includes in some embodiments one or more of the following sub-components: an co-channel interference determination component 908 and a adjacent channel interference determination component. The resource allocation component 924 includes in a frequency bandwidth allocation component 926 and a transmission power allocation component 928.

The control routines component 902 is configured to control operation of the SAS.

The message generator component 904 is configured to generate messages for transmission to other devices, e.g., other SAS devices and CBSD devices, e.g., resource allocations messages including frequency bandwidth allocated to a CBSD and transmission power allocations for the CBSD, transmit power change commands, registration messages, frequency spectrum channel assignments, time duration value to be used for collecting and/or measuring information and/or making determination for example, type of traffic being carried by the CBSD determination, average UE power headroom value, average uplink bit error rate.

The electromagnetic interference determination component 906 is configured to determine actual or potential electromagnetic interference to be caused by wireless, e.g., radio transmission from active CBSD devices and CBSDs to be activated and/or UE devices other devices transmitting in the CBRS networks frequency band. The co-channel interference determination sub-component 908 determines co-channel interference on a channel at a location. In some embodiments, it also determines the potential amount of co-channel interference to be expected if the channel was assigned to a CBSD at a certain location. In some embodiments, it also determines the channel with the least amount of co-channel interference from a plurality of channels available for assignment to a CBSD. In some embodiments, it also determines whether a channel has a moderate amount of co-channel interference. The adjacent channel interference determination sub-component 910 determines adjacent channel interference on a channel at a location. In some embodiments, it also determines the potential amount of adjacent channel interference to be expected if the channel was assigned to a CBSD at a certain location. In some embodiments, it also determines the channel with the least amount of adjacent channel interference from a plurality of channels available for assignment to a CBSD. In some embodiments, it also determines whether a channel has a moderate amount of adjacent channel interference.

The frequency spectrum channel assignment selector/determinator component is configured to select and/or determine a channel to assign to a CBSD, e.g., in response to a channel allocation/assignment request or channel allocation/assignment update request.

The power management component 914 is configured to manage power transmission levels to maximize usage of spectrum while minimizing interference and in some embodiments is a sub-component of the resource allocation component. The power management component 914 determines the power transmission levels for CBSDs managed by the SAS and in some embodiments are sub-components of the resource allocation component 924.

The communications component 916 is configured to handle communications between the SAS and other nodes/devices, e.g., CBSD device, FCC database, ESC system including receipt and transmission of messages and protocol signaling.

The average UE power headroom threshold value component 918 determines an UE power headroom threshold value used to determine whether the reported average UE power headroom value reported by CBSDs is higher than the UE power headroom threshold value and therefore an updated channel assignment should be determined for the CBSD and/or an evaluation of the adjacent channel interference determination should be undertaken.

The uplink bit error rate threshold value component 920 determines an uplink bit error rate threshold value used to determine whether the r average uplink bit error rate determined and/or reported by CBSDs is higher than the uplink bit error rate threshold value and therefore an updated channel assignment should be determined for the CBSD and/or an evaluation of the adjacent channel interference determination should be undertaken. In some embodiments, the SAS transmits the uplink bit error rate threshold to the CBSD and/or the UE power headroom threshold to the CBSD, for use by the CBSD to determine whether or not to request a frequency spectrum channel assignment update.

The spectrum management component 922 is configured to manage the allocation of frequency spectrum in the CBRS network including frequency bandwidth allocated to CBSDs managed by the SAS. In some embodiments, the spectrum management component 922 is a sub-component of resource allocation component 924.

The resource allocation component 924 is configured to allocate resources including for example frequency bandwidth allocations and/or transmission power allocations for CBSDs managed by the SAS. In some embodiments, the resource allocation component 924 includes sub-components frequency bandwidth allocation component 926 and transmission power allocation component 928. The frequency bandwidth allocation component 926 is configured to allocate frequency bandwidth for a CBSD, e.g., frequency spectrum channels based on the traffic type being carried by the CBSD, channel interference, e.g., co-channel interference and/or adjacent channel interference, user equipment power headroom, uplink bit error rate and in some embodiments based on the estimated coverage area of the CBSD. The transmission power allocation component 928 is configured to allocate transmission power to a CBSD based on the estimated coverage area of the CBSD and to make power transmit level changes to maximize efficiency of the CBRS network's spectrum.

The CBSD traffic type determinator component 930 is configured to determine from information provided by a CBSD the type of traffic that the CBSD is carrying, e.g., from one of the following downlink dominated traffic, uplink dominated traffic, balanced downlink and uplink traffic.

The time duration/interval value for CBSD to use to make measurements and/or determinations component 932 is configured to determine the duration of time that a CBSD should use to determine the traffic type it is carrying, collect UE information, e.g., power headroom information and/or uplink bit error rate information which is sent to a CBSD.

The determinator component 934 is configured to make one or more decisions or determinations such as for example, determine a CBSD traffic type, determine co-channel interference, adjacent channel interference, available channel with least co-channel interference, available channel with least adjacent channel interference, available channels with a moderate amount of adjacent channel interference, available channels with a moderate amount of co-channel interference, frequency spectrum allocation determinations, channel assignment determination, determinations as to whether a CBSD reported/provided average UE power headroom value exceeds a threshold value, determinations as to whether a CBSD reported/provided average uplink bit error rate exceeds a uplink bit error rate threshold, determinations of power transmission levels for CBSDs.

Figure 11A:
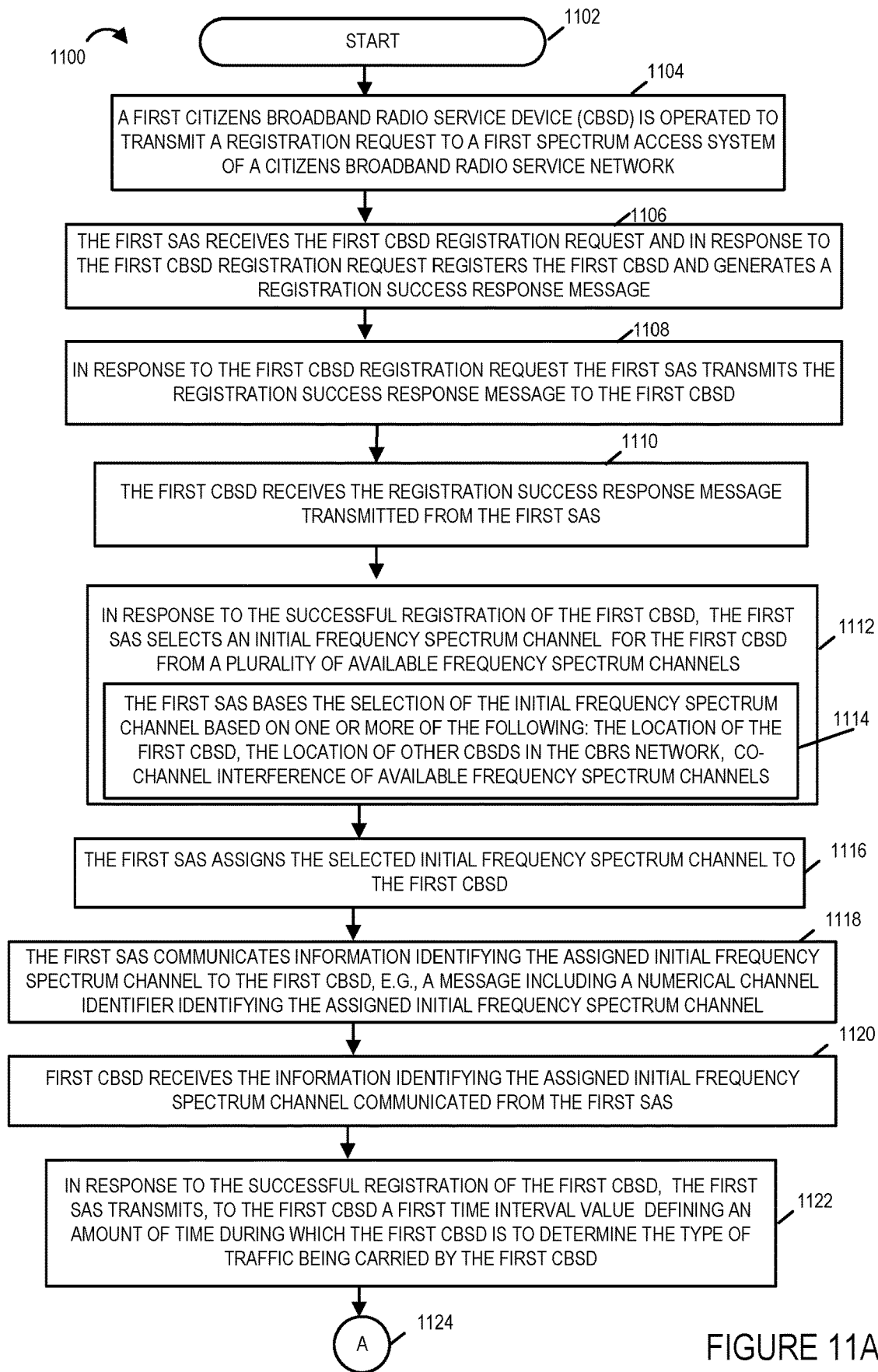
FIG. 11A is a first part of a flowchart illustrating an exemplary method in accordance with one embodiment of the present invention.
Figure 11B:
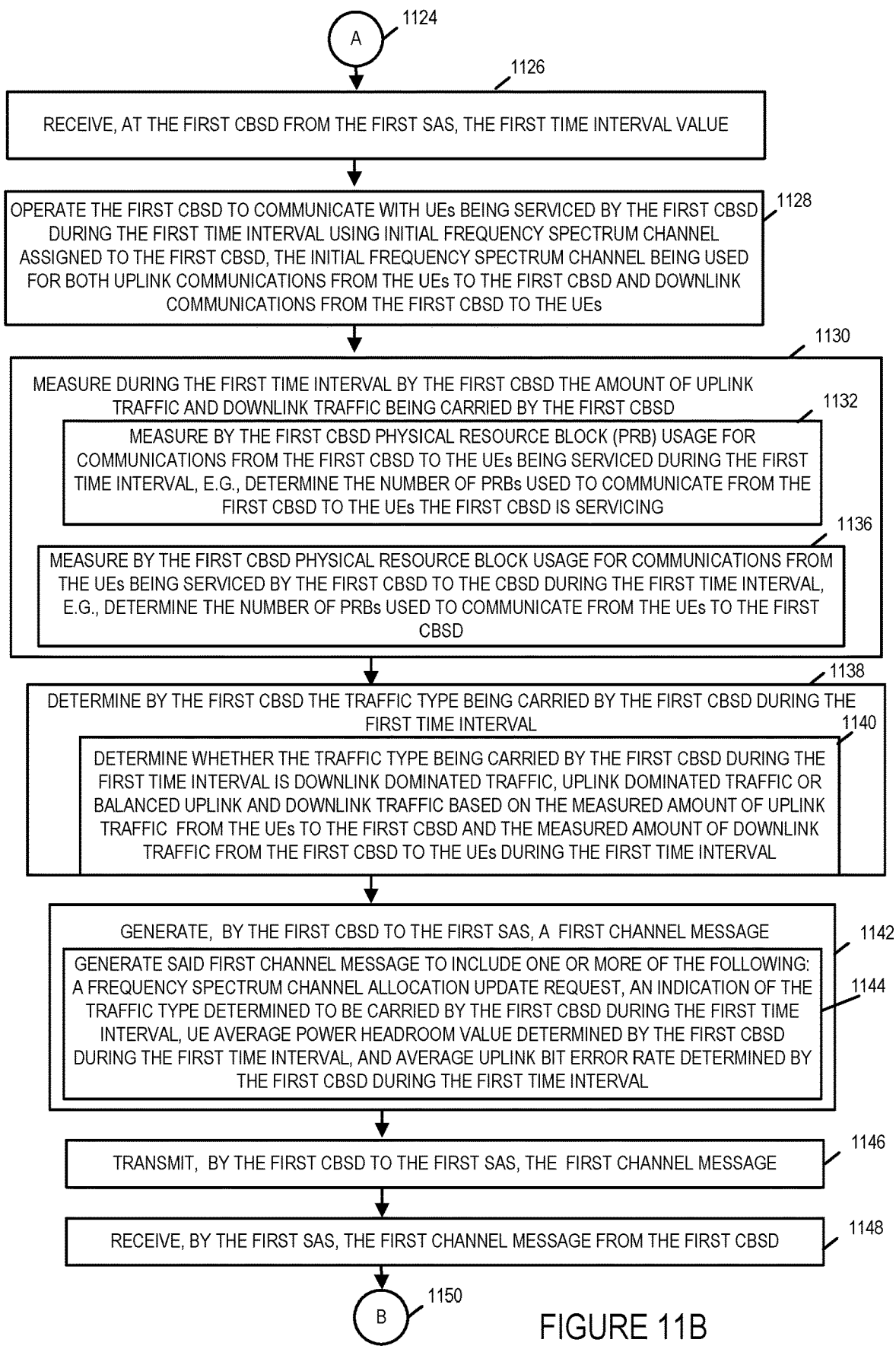
FIG. 11B is a second part of a flowchart illustrating an exemplary method in accordance with one embodiment of the present invention.
Figure 11C:
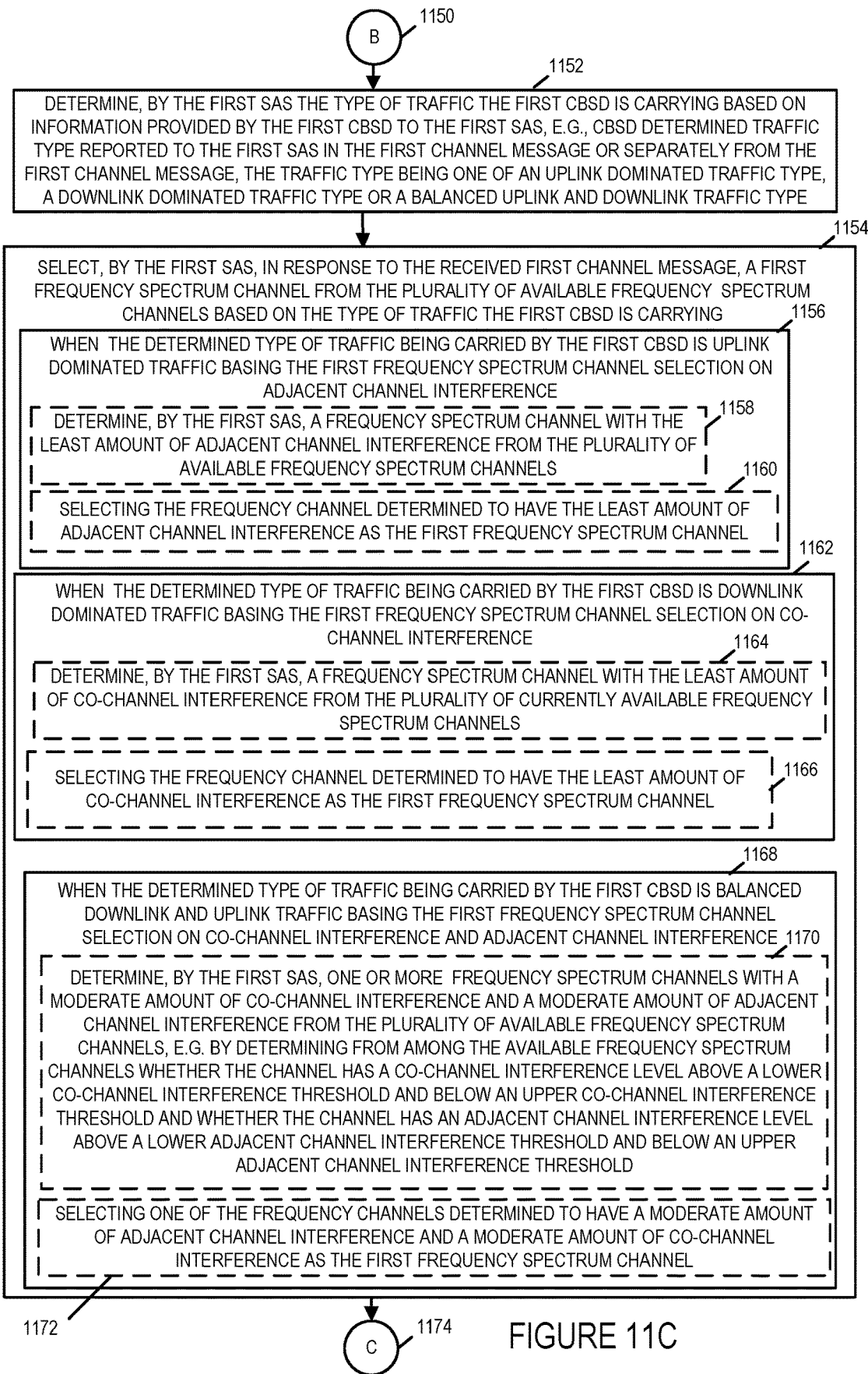
FIG. 11C is a third part of a flowchart illustrating an exemplary method in accordance with one embodiment of the present invention.
Figure 11D:
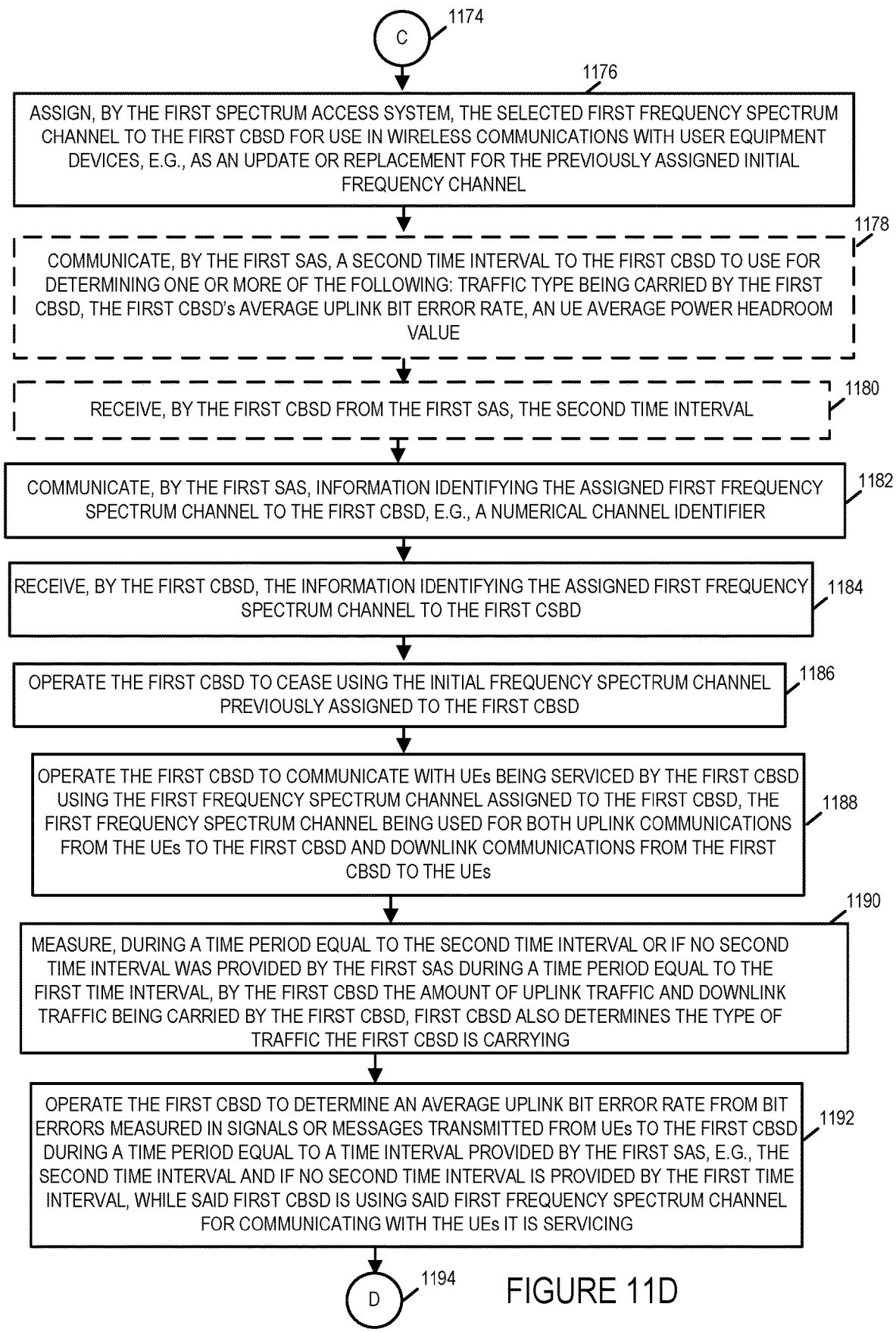
FIG. 11D is a fourth part of a flowchart illustrating an exemplary method in accordance with one embodiment of the present invention.
Figures 11, 11A, 11B, 11C, 11D, 11E, 11F:
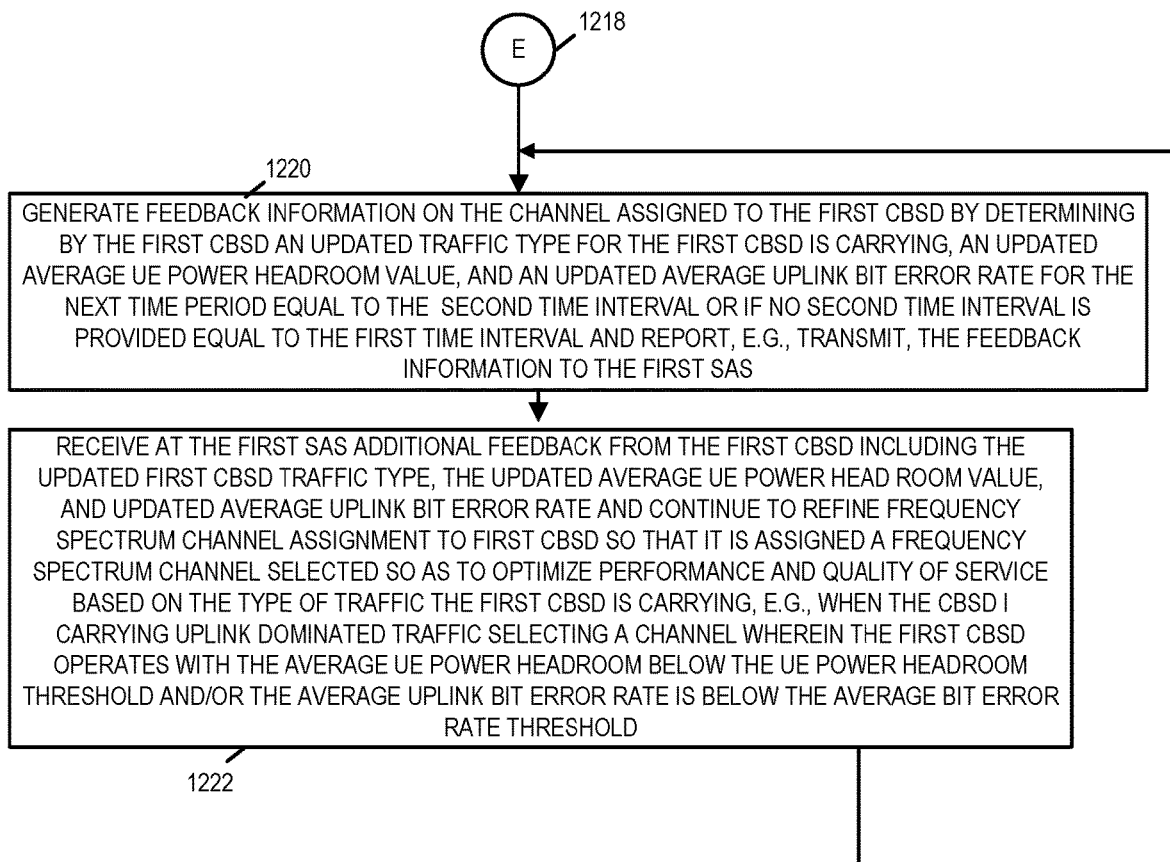
FIG. 11 illustrates the combination of FIGS. 11A, 11B, 11C, 11D, 11E and 11F.
FIG. 11E is a fifth part of a flowchart illustrating an exemplary method in accordance with one embodiment of the present invention.
FIG. 11F is a sixth part of a flowchart illustrating an exemplary method in accordance with one embodiment of the present invention.

FIG. 11 illustrates the combination of FIGS. 11A, 11B, 11C, 11D, 11E and 11F. FIG. 11 illustrates a flowchart of a method 1100 which is another exemplary method in accordance with one embodiment of the present invention. FIG. 11A is a first part of a flowchart illustrating an exemplary method in accordance with one embodiment of the present invention. FIG. 11B is a second part of a flowchart illustrating an exemplary method in accordance with one embodiment of the present invention. FIG. 11C is a third part of a flowchart illustrating an exemplary method in accordance with one embodiment of the present invention. FIG. 11D is a fourth part of a flowchart illustrating an exemplary method in accordance with one embodiment of the present invention. FIG. 11E is a fifth part of a flowchart illustrating an exemplary method in accordance with one embodiment of the present invention. FIG. 11F is a sixth part of a flowchart illustrating an exemplary method in accordance with one embodiment of the present invention. For explanatory purposes the exemplary method 1100 will be explained in connection with the exemplary CBRS network system 100 illustrated in FIG. 1 although it should be understand that the method may be implemented using other systems and other system configurations then those illustrated in FIG. 1.

The method 1100 will now be discussed in detail. The method starts in start step 1102 shown on FIG. 11A with the devices in system 100 being initialized and becoming operational. Operation proceeds from start step 1102 to step 1104.

In step 1104, a first Citizens Broadband Radio Service Device, e.g., CBSD 1 102 of system 100, is operated to transmit a registration request to a first Spectrum Access System, e.g., SAS 1 106 of system 100, of a Citizens Broadband Radio Service Network, e.g., system 100 of FIG. 1. Operation proceeds from step 1104 to step 1106.

In step 1106, the first SAS receives the first CBSD registration request and in response to the first CBSD registration request registers the first CBSD and generates a registration success response message. Operation proceeds from step 1106 to step 1108.

In step 1108, in response first CBSD registration request the first SAS transmits the registration success response message to the first CBSD. Operation proceeds from step 1108 to step 1110.

In step 1110, the first CBSD receives the registration success response message transmitted from the first SAS. Operation proceeds from step 1110 to step 1112.

In step 1112, in response to the successful registration of the first CBSD, the first SAS selects an initial frequency spectrum channel for the first CBSD from a plurality of available frequency spectrum channels. Step 1112 in some embodiments includes sub-step 1114. In sub-step 1114, the first SAS bases the selectin of the initial frequency spectrum channel based on one or more of the following: the location of the first CBSD, the location of other CBSDs in the CBRS network, co-channel interference of spectrum channels available for assignment. Operation proceeds from step 1112 to step 1116.

In step 1116, the first SAS assigns the selected initial frequency spectrum channel to the first CBSD. In some embodiments, once a frequency spectrum channel has been assigned it is designated as no longer available and is removed from the plurality of frequency spectrum channels available for assignment. Operation proceeds from step 1116 to step 1118.

In step 1118, the first SAS communicates information identifying the assigned initial frequency spectrum channel to the first CBSD, e.g., a message including a numerical channel identifier identifying the assigned initial frequency spectrum channel is communicated to the first CBSD. Operation proceeds from step 1118 to step 1120.

In step 1120, the first CBSD receives the information identifying the assigned initial frequency spectrum channel communicated from the first SAS. Operation proceeds from step 1120 to step 1122.

In step 1122, in response to the successful of the first CBSD, the first SAS also transmit, to the first CBSD a first time interval value or period defining an amount of time during which the first CBSD is to determine the type of traffic being carried by the first CBSD. For example, the time interval may be, and in some embodiments is a week. In other exemplary embodiments the time interval is a day or a month. The time interval is determined so that the first CBSD has a sufficient sampling of traffic so that it can accurately determine the type of traffic the first CBSD is carrying. Operation proceeds from step 1122 via connection node A 1124 to step 1126 shown on FIG. 11B.

In step 1126, the first CBSD receives from the first SAS the first time interval value. In most embodiments, the first CBSD stores the received first time interval value in memory for future reference. Operation proceeds from step 1126 to step 1128.

In step 1128, the first CBSD is operated to communicate with UEs being serviced by the first CBSD using the initial frequency spectrum channel assigned to the first CBSD. The initial frequency spectrum channel being used for uplink communications from the UEs to the first CBSD and downlink communications from the first CBSD to the UEs being serviced by the first CBSD. The first CBSD also begins a timer for determining when a time period equal to the first time interval has been reached. Operation proceeds from step 1128 to step 1130.

In step 1130, until the timer indicates that a time period equal to the first time interval has passed, the first CBSD measures the amount of uplink traffic and downlink traffic being carried by the first CBSD on the initial frequency spectrum channel. Step 1130 may, and in some embodiments does, include one or more sub-steps 1132 and 1136. In sub-step 1132, the first CBSD as part of measuring the downlink traffic measures the physical resource block (PRB) usage for communications from the first CBSD to the UEs being serviced, e.g., by determining the number of PRBs used to communicate from the first CBSD to the UEs being serviced by the first CBSD. In sub-step 1136, the first CBSD as part of measuring the amount of uplink traffic measures the physical resource block usage for communications from the UEs being serviced by the first CBSD to the first CBSD, e.g., by determining the number of PRBs used to communicate from the UEs to the first CBSD. Operation proceed from step 1130 to step 1138.

In step 1138, the first CBSD determines the traffic type being carried by the first CBSD during a time interval equal to the first time interval specified by the first SAS. The traffic type being one of uplink dominated traffic type, downlink dominated traffic type or balanced uplink and downlink traffic. Balanced uplink and downlink traffic are also sometimes referred to herein as balanced downlink and uplink traffic. In some embodiments, step 1138 includes sub-step 1140. In sub-step 1140, the first CBSD determines whether the traffic type being carried by the first CBSD is downlink dominated traffic, uplink dominated traffic, or balanced uplink and downlink traffic based on the measured amount of uplink traffic from the UEs to the first CBSD and the measured amount of downlink traffic from the first CBSD to the UEs. Operation proceeds from step 1138 to step 1142.

In step 1142, the first CBSD generates a first channel message. Step 1142 may, and in some embodiments does, include sub-step 1144. In sub-step 1144, the first channel message is generated by the first CBSD to include one or more of the following: a frequency spectrum channel allocation update request, an indication of the traffic type determined to be carried by the first CBSD during a time period equal to the first time interval while the initial frequency spectrum channel was used for communications by the first CBSD, an UE average power headroom value determined by the first CBSD during the time period equal to the first time interval while the initial frequency spectrum channel was used for communications by the first CBSD, and an average uplink bit error rate determined by the first CBSD during the time period equal to the first time interval while the initial frequency spectrum channel was used for communications by the first CBSD. In many embodiments, the average uplink bit error rate and average power headroom value are not determined or communicated to the first SAS until a first time interval period has passed in which the first CBSD has determined that the first CBSD is carrying uplink dominated traffic. Operation proceeds from step 1144 to step 1146.

In step 1146, the first CBSD transmits to the first SAS the first channel message. Operation proceeds from step 1146 to step 1148.

In step 1148, the first SAS receives the first channel message from the first CBSD. Operation proceeds from step 1148 via connection node B 1150 to step 1152 shown on FIG. 11C.

In step 1152, the first SAS determines the type of traffic the first CBSD is carrying based on information provided by the first CBSD to the first SAS, e.g., CBSD determined traffic type reported to the first SAS in the first channel message or separately from the first channel message, the traffic type being one of an uplink dominated traffic type, a downlink dominated traffic type, or a balanced uplink and downlink traffic type. Operation proceeds from step 1152 to step 1154.

In step 1154, in response to the received first channel message the first SAS selects a first frequency spectrum channel from the plurality of available frequency spectrum channels based on the type of traffic the first CBSD is carrying. In some embodiments, the step 1154 includes sub-steps 1156, 1162 and 1168.

In sub-step 1156 when the determined type of traffic being carried by the first CBSD is uplink dominated traffic the first SAS bases the first frequency spectrum channel selection on adjacent channel interference. Sub-step 1156 may, and in some embodiments does, include one or more sub-steps 1158 and 1160. In sub-step 1158, the first SAS determines a frequency spectrum channel with the least amount of adjacent channel interference from the plurality of available frequency spectrum channels. In sub-step 1160, the first SAS selects the frequency channel determined to have the least amount of adjacent channel interference as the first frequency spectrum channel.

In sub-step 1162, when the determined type of traffic being carried by the first CBSD is downlink dominated traffic, the first SAS bases the first frequency spectrum channel selection on co-channel interference. In some embodiments, sub-step 1162 includes one or more sub-steps 1164 and 1166. In sub-step 1164, the first SAS determines a frequency spectrum channel with the least amount of co-channel interference from the plurality of available frequency spectrum channels. In sub-step 1166, the first SAS selects the frequency spectrum channel determined to have the least amount of co-channel interference as the first frequency spectrum channel.

In sub-step 1168, when the determined type of traffic being carried by the first CBSD is balanced downlink and uplink traffic, the first SAS bases the first frequency spectrum channel selection on co-channel interference and adjacent channel interference. Sub-step 1168 includes in some embodiments on or more sub-steps 1170 and 1172. In sub-step 1170, the first SAS determines one or more frequency spectrum channels with a moderate amount of co-channel interference and a moderate amount of adjacent channel interference from the plurality of available frequency spectrum channels, e.g., by determining from among the available frequency spectrum channels whether the channel has a co-channel interference level above a lower co-channel interference threshold and below an upper co-channel interference threshold and whether the channel has an adjacent channel interference level above a lower adjacent channel interference threshold and below an upper adjacent channel interference threshold. In sub-step 1172, the first SAS selects one of the frequency spectrum channels determined to have both a moderate amount of adjacent channel interference and a moderate amount of co-channel interference as the first frequency spectrum channel. The first SAS makes the co-channel and adjacent channel determines based on channel information provided by the CBSDs which it is controlling as well as channel information provided by other SAS devices in the CBRS network, e.g., SAS 2 107 of system 100 of FIG. 1. The channel information may, and in some embodiments does, include transmit power levels for the CBSDs corresponding to the channels, channel quality indicator values corresponding to the channels, frequency interference reported corresponding to the channels. Operation proceeds from step 1154 via connection node C 1174 to step 1176 shown on FIG. 11D.

In step 1176, the first SAS assigns the selected first frequency spectrum channel to the first CBSD for use in wireless communications with UEs, e.g., as an update or replacement for the previously assigned initial frequency spectrum channel. The assignment of the first frequency spectrum channel as a replacement for the initial frequency spectrum channel in most embodiments results in the initial frequency spectrum channel which has been replaced as being designated as an available frequency spectrum channel and being included in the plurality of available frequency spectrum channels. Operation proceeds from step 1176 to step 1178.

In optional step 1178, the first SAS communicates a second time interval to the first CBSD to use for determining one or more of the following: traffic type being carried by the first CBSD, the first CBSD's average uplink bit error rate, an average UE power headroom value. The second time interval replacing the first time interval. The use of the second time interval also for flexibility in adjusting the time period for the first CBSD to perform measurements and make determinations on the quality of the channel assigned to the first CBSD, e.g., uplink bit error rate, average power headroom value, type of traffic. In some embodiments, each time the first CBSD is assigned a channel the SAS may optionally send a time interval to the first CBSD to use for performing measurements and reporting measurements regarding the assigned channel. Operation proceeds from step 1178 to step 1180.

In optional step 1180, the first CBSD receives from the first SAS the second time interval. Operation proceeds from step 1180 to step 1182.

In step 1182, the first SAS communicates information identifying the assigned first frequency spectrum channel to the first CBSD, e.g., as a numerical channel identifier. Operation proceeds from step 1182 to step 1184.

In step 1184, the first CBSD receives the information identifying the assigned first frequency spectrum channel to the first CBSD. Operation proceeds from step 1184 to step 1186.

In step 1186, the first CBSD is operated to cease using the initial frequency spectrum channel previously assigned to the first CBSD. Operation proceeds from step 1186 to step 1188.

In step 1188, the first CBSD is operated to communicate with the UEs being serviced by the first CBSD using the first frequency spectrum channel assigned to the first CBSD. The first frequency spectrum channel is used for both uplink communications form the UEs to the first CBSD and for downlink communications from the first CBSD to the UEs. Operation proceeds from step 1188 to step 1190.

In step 1190, during a time period equal to the second time interval or if no second time interval was provided during a time period equal to the first time interval, the first CBSD measures the amount of uplink traffic and downlink traffic being carried by the first CBSD and determines whether the first CBSD is carrying uplink dominated traffic, downlink dominated traffic or balance downlink and uplink traffic as previously described. Operation proceeds from step 1190 to step 1192.

In step 1192, the first CBSD is operated to determine an average uplink bit error rate from the bit errors measured in signals or messages transmitted from UEs to the first CBSD during a time period equal to the time interval provided by the first SAS, e.g., the second time interval provided by the SAS and if no second time interval then the first time interval, while the first CBSD is using the first frequency spectrum channel for communicating with the UEs it is servicing. Operation proceeds from step 1192 via connection node D 1194 to step 1196 shown on FIG. 11E.

In step 1196, the first CBSD is operated to generate an average UE power headroom value from UE power headroom values reported to the first CBSD during the time period equal to a time interval provide by the first SAS, e.g., the second interval or if no second time interval is provided than the first time interval, while the first CBSD is using the first frequency spectrum channel for communicating with the UEs it is servicing. The time period over which the first CBSD determines the CBSD traffic type, the UE average power headroom value and the average uplink bit error rate is the same for steps 1190, 1192, and 1196 that is the steps are performed concurrently during the same time interval. Operation proceeds from step 1196 to step 1198.

In step 1198, the first CBSD generates a second channel message which includes the average UE power headroom value, the average uplink bit error rate, and information indicating the CBSD traffic type determined during the time interval when the first CBSD is communicating with the UEs it is servicing using the first frequency spectrum channel, i.e., the period of time equal to the first time interval or the second time interval as previously discussed in connection with steps 1190, 1192, and 1198. In some embodiments, the CBSD traffic type is not included in the second channel message. In some embodiments only one of the UE average power headroom value and the average uplink bit error rate are included. In some embodiments the CBSD traffic type, average uplink bit error rate and/or UE average power headroom value are communicated to the first SAS in different messages. Operation proceeds from step 1198 to step 1200.

In step 1200, the first CBSD transmits the second channel message from the first CBSD to the first SAS. Operation proceeds from step 1200 to step 1202.

In step 1202, the second channel message is received by the first SAS from the first CBSD. Operation proceeds from step 1202 to step 1204.

In step 1204, the first SAS, determines whether to assign a different spectrum access channel to the first CBSD based on one or more of the following which correspond to the time period the first CBSD has been using the first frequency spectrum channel: the received information identifying the type of traffic being carried by the first CBSD, the average uplink bit error rate, and the average UE power headroom value. Step 1204 includes sub-steps 1210 and 1212 and in some embodiments sub-steps 1206 and 1208. In sub-step 1206, the first SAS determines to assign a different frequency spectrum channel to the first CBSD when the determined traffic type is uplink dominated traffic and either the average uplink bit error rate is greater than an uplink bit error rate threshold or the average UE power headroom value is greater than an average UE power headroom threshold. The average uplink bit error rate and average UE power headroom values provide indirect information on the frequency spectrum channel which the first CBSD is using. When either the average uplink bit error rate is high or the average UE power headroom is high, it is an indication that there is high probability of interference causing the UEs to be operating near or at maximum transmit power levels and that there is interference resulting in high bit error rate. In sub-step 1208, the first SAS determines to assign a different frequency spectrum channel to the first CBSD when the determined traffic type is uplink dominated traffic and both the average uplink bit error rate is greater than an uplink bit error rate threshold and the average UE power headroom value is greater than an average UE power headroom threshold. By requiring both the average uplink bit error rate and average UE power headroom value to be above threshold there is additional evidence that the assigned channel is experiencing interference and that there may be other channels that are better suited to the uplink dominated traffic the first CBSD is carrying. In some embodiments, the first SAS determines to assign a different frequency spectrum channel to the first CBSD because the type of traffic the first CBSD is carrying has changed from when the first SAS assigned the channel currently being used by the first CBSD in which case a more efficient use of the spectrum resources requires taking the change in traffic type into account in connection with the frequency spectrum channel assigned to the first CBSD. For example, if the type of traffic has changed from downlink dominated to uplink dominated traffic to optimize the frequency spectrum allocated to the first CBSD a change from a channel with the least co-channel interference to one with the least adjacent channel interference should be made.

In sub-step 1210, when the first SAS determines to assign a different frequency spectrum channel to the first CBSD operation proceeds from step 1204 to step 1214. In sub-step 1212, when the first SAS determines not to assign a different frequency spectrum channel to the first CBSD operation proceeds from step 1212 via connection node E 1218 to step 1220 shown on FIG. 11F.

In step 1214, the first SAS selects and assigns a different frequency spectrum channel to the first CBSD using the process described in connection with step 1154 and in some embodiments also basing the channel selection decision on the average uplink bit error rate and average power headroom value provided corresponding to the first spectrum channel currently assigned. Operation proceeds from step 1214 to step 1216.

In step 1216, the first SAS communicates information identifying the selected different frequency spectrum channel assignment to the first CBSD. Operation proceeds from step 1216 via connection node E 1218 to step 1220.

In step 1220, the first CBSD generates additional feedback on the channel assigned to the first CBSD in step 1214 by determining by the first CBSD the traffic type the first CBSD is carrying, an average UE power headroom value, and an average uplink bit error rate for the next time period equal to the second time interval provided by the first SAS or the first time interval if the no second time interval was provided and reporting back, e.g., sending, the generated feedback information to the first SAS. Operation proceeds from step 1220 to step 1222.

In step 1222, the first SAS receives the additional feedback information from the first CBSD and continues to refine the frequency spectrum channel assignment to the first CBSD so that it is assigned the most suitable channel for the traffic type is carrying so as to minimize the type of the interference that most affects the traffic type. For example, the frequency spectrum channel assignment is updated by the first SAS so that first SAS operates with the average UE power headroom value below the UE power headroom threshold value and/or the average uplink bit error rate below the average uplink bit error rate threshold when the first CBSD traffic has uplink dominated traffic. Operation proceeds from step 1222 to step 1220 where the method proceeds as previously described.

List of Set of Exemplary Numbered Method Embodiments

Method Embodiment 1. A method of allocating frequency spectrum resources in a Citizens Broadband Radio Service (CBRS) network, the method including: receiving, by a first Spectrum Access System (SAS), a first channel message (e.g., frequency spectrum channel allocation request, a message reporting CBSD traffic type, UE average power headroom or uplink average bit error rate), from a first Citizens Broadband Radio Service Device (CBSD); selecting, by the first Spectrum Access System, in response to the received first channel message (e.g., frequency spectrum channel allocation request, a message reporting CBSD traffic type, UE average power headroom or uplink average bit error rate), a first frequency spectrum channel from a plurality of available frequency spectrum channels based on a type of traffic the first Citizens Broadband Radio Service Device is carrying; assigning, by the first Spectrum Access System, the selected first frequency spectrum channel to the first CBSD for use in wireless communications with user equipment devices; communicating, by the first Spectrum Access System, information identifying the assigned first frequency spectrum channel to the first CBSD.

Method Embodiment 2. The method of method embodiment 1, wherein said first channel message includes one or more of the following: a frequency spectrum channel allocation request, information indicating the type of traffic the first CBSD is carrying, an UE average power headroom value and an average uplink bit error rate.

Method Embodiment 3. The method of method embodiment 1, wherein the information identifying the assigned first frequency spectrum channel is a channel identifier.

Method Embodiment 4. The method of method embodiment 1, wherein the selected first frequency spectrum channel is used by the first CBSD for both uplink and downlink communications with user equipment devices being serviced by said first CBSD regardless of traffic type.

Method Embodiment 5. The method of method embodiment 3, wherein the channel identifier is a numerical value.

Method Embodiment 6. The method of method embodiment 1, wherein the assigned first frequency spectrum channel is designated as no longer being an available frequency spectrum channel.

Method Embodiment 7. The method of method embodiment 1, wherein the type of traffic the first CBSD is carrying is one of the following traffic types: downlink dominated traffic type, uplink dominated traffic type, and balanced downlink and uplink traffic type.

Method Embodiment 8. The method of method embodiment 7 further comprising: prior to selecting the first frequency spectrum channel determining the type of traffic the first CBSD is carrying based on information provided by the first CBSD to the first Spectrum Access System; and when the determined type of traffic being carried by the first CBSD is said uplink dominated traffic basing said first frequency spectrum channel selection on adjacent channel interference.

Method Embodiment 9. The method of method embodiment 8 further comprising: determining, by the first Spectrum Access System, a frequency spectrum channel with the least amount of adjacent channel interference from the plurality of available frequency spectrum channels; and wherein said basing said first frequency spectrum channel selection on adjacent channel interference includes selecting the frequency spectrum channel determined to have the least amount of adjacent channel interference as the first frequency spectrum channel.

Method Embodiment 10. The method of method embodiment 8 further comprising: when the determined type of traffic being carried by the first CBSD is said downlink dominated traffic basing said first frequency spectrum channel selection on co-channel interference; and determining, by the first Spectrum Access System, a frequency spectrum channel with the least amount of co-channel interference from the plurality of available frequency spectrum channels; and wherein said basing said first frequency spectrum channel selection on co-channel interference includes selecting the frequency spectrum channel determined to have the least amount of co-channel interference as the first frequency spectrum channel.

Method Embodiment 11. The method of method embodiment 10 further comprising: when the determined type of traffic being carried by the first CBSD is said balanced downlink and uplink traffic determining said first frequency spectrum channel selection on co-channel interference and adjacent channel interference; and determining, by the first Spectrum Access System, frequency spectrum channels with a moderate amount of co-channel interference and a moderate amount of adjacent channel interference from the plurality of available frequency spectrum channels; and wherein said basing said first frequency spectrum channel selection on co-channel interference and adjacent channel interference includes selecting one of the frequency spectrum channels determined to have a moderate amount of co-channel interference and a moderate amount of adjacent channel interference as the first frequency spectrum channel.

Method Embodiment 12. The method of method embodiment 11, wherein said moderate amount of co-channel interference is a frequency spectrum channel that does not have the least amount of co-channel interference from the plurality of available frequency spectrum channels; and wherein said moderate amount of adjacent channel interference is a frequency spectrum channel that does not have the least amount of adjacent channel interference from the plurality of available frequency spectrum channels.

Method Embodiment 13. The method of method embodiment 11, wherein said moderate amount of co-channel interference is a frequency spectrum channel that has an amount of co-channel interference above a first co-channel interference level and below a second co-channel interference level; and wherein said moderate amount of adjacent channel interference is a frequency spectrum channel that has an amount of adjacent channel interference above a first adjacent channel interference level and below a second co-channel interference level.

Method Embodiment 14. The method of method embodiment 13, wherein said moderate amount of co-channel interference is a frequency spectrum channel that does not have the least amount of co-channel interference from the plurality of available frequency spectrum channels; and wherein said moderate amount of adjacent channel interference is a frequency spectrum channel that does not have the least amount of adjacent channel interference from the plurality of available frequency spectrum channels.

Method Embodiment 15. The method of method embodiment 14, wherein said moderate amount of co-channel interference is a frequency spectrum channel that does not have the most amount of co-channel interference from the plurality of available frequency spectrum channels; and wherein said moderate amount of adjacent channel interference is a frequency spectrum channel that does not have the most amount of adjacent channel interference from the plurality of available frequency spectrum channels.

Method Embodiment 16. The method of method embodiment 12 wherein said plurality of available frequency spectrum channels are frequency spectrum channels available for allocation to CBSDs but which are not currently assigned to a CBSD.

Method Embodiment 17. The method of method embodiment 1, wherein said frequency spectrum channel is a block or band of contiguous frequencies.

Method Embodiment 18. The method of method embodiment 1, wherein said frequency spectrum channel is a 10 MHz band of contiguous frequencies.

Method Embodiment 19. The method of method embodiment 17 wherein said adjacent channel interference is interference caused by wireless transmissions in frequency spectrum channels which are adjacent channels in the frequency spectrum either above or below a selected frequency spectrum channel.

Method Embodiment 20. The method of method embodiment 19 wherein said co-channel interference is interference caused by unwanted wireless transmissions in the same frequency spectrum channel as the selected frequency spectrum channel when multiple CBSDs are assigned the same frequency spectrum channel.

Method Embodiment 21. The method of method embodiment 1 further comprising: prior to receiving said first channel message (e.g., frequency spectrum channel allocation request, a message reporting CBSD traffic type, UE average power headroom or uplink average bit error rate), receiving a registration request from the first CBSD by the first Spectrum Access System; registering the first CBSD at the first Spectrum Access System; in response to the registration of the first CBSD, selecting, by the first Spectrum Access System, an initial frequency spectrum channel for the first CBSD from the plurality of available frequency spectrum channels based on a location of the first CBSD and co-channel interference; assigning, by the first Spectrum Access System, the selected initial frequency spectrum channel to the first CBSD; communicating, by the first Spectrum Access System, information identifying the assigned initial frequency spectrum channel to the first CBSD; communicating a first time interval to the first CBSD, said first time interval defining an amount of time during which the first CBSD is to determine the type of traffic being carried by the first CBSD.

Method Embodiment 22. The method of method embodiment 21 further comprising: receiving, by the first CBSD from the first SAS in response to registering with the first SAS, said information identifying the initial frequency spectrum channel assigned to the first CBSD and the first time interval; operating the first CBSD to communicate with UEs being serviced by the first CBSD during the first time interval using the initial frequency spectrum channel assigned to the first CBSD; measuring during the first time interval, by the first CBSD, the amount of uplink traffic and downlink traffic being carried by the first CBSD; determining whether the traffic type being carried by the first CBSD during the first time interval is downlink dominated traffic, uplink dominated traffic or balanced downlink and uplink traffic based on the measured amount of uplink traffic and downlink traffic being carried by the first CBSD during the first time interval; reporting by the first CBSD to the first SAS the determined traffic type being carried by the first CBSD during the first time interval.

Method Embodiment 23. The method of method embodiment 22, wherein measuring during the first time interval, by the first CBSD, the amount of uplink traffic and downlink traffic being carried by the first CBSD includes: measuring the number of physical resource blocks (PRBs) used for communications from the first CBSD to the UEs being serviced during the first time interval; and measuring the number of physical resource blocks (PRBs) used for communications from the first CBSD to the UEs being serviced during the first time interval.

Method Embodiment 24. The method of method embodiment 7, wherein the first channel message includes a frequency spectrum channel allocation update request, information indicating the type of traffic being carried by the first CBSD, an UE average power headroom value, an average uplink bit error rate, and a time period over which the information indicating the type of traffic being carried by the first CBSD, the UE average power headroom value, and the average uplink bit error rate where determined; and wherein the first CBSD uses the same frequency spectrum channel for both uplink and downlink communications.

Method Embodiment 25. The method of method embodiment 7, wherein said first channel message is a request for an assignment of a different frequency spectrum channel to replace the frequency spectrum channel currently assigned to the first CBSD.

Method Embodiment 26. The method of method embodiment 25, wherein said first channel message includes one or more of the following: information identifying the type of traffic being carried by the first CBSD, an average uplink bit error rate, and an average UE power headroom value.

Method Embodiment 27. The method of method embodiment 26, wherein the first CBSD determines the type of traffic being carried by the first CBSD by: (i) measuring a number of physical resource blocks (PRBs) used in downlink communications from the first CBSD to the UEs being serviced by the first CBSD, and (ii) measuring the number of physical resource blocks used in uplink communications from the UEs being serviced by the first CBSD to the first CBSD.

Method Embodiment 28. The method of method embodiment 27, wherein determining the type of traffic being carried by the first CBSD further includes: generating a traffic percentage from the number of physical resource blocks used in downlink communications and the number of physical resource blocks used in uplink communications; comparing the generated traffic percentage to a first threshold and a second threshold.

Method Embodiment 29. The method of method embodiment 28, wherein the first threshold is a downlink dominated traffic threshold and the second threshold is an uplink dominated traffic threshold.

Method Embodiment 30. The method of method embodiment 29, wherein said traffic percentage is a percentage of the number of PRBs used in downlink communications to the combined number of PRBs used in both downlink and uplink communications; wherein when the generated traffic percentage is greater than the downlink dominated traffic threshold the first CBSD determines that the traffic type the first CBSD is carrying is downlink dominated traffic; wherein when the generated traffic percentage is less than the uplink dominated traffic threshold the first CBSD determines the traffic type the first CBSD is carrying is uplink dominated traffic; wherein when the generated traffic percentage is less than or equal to the downlink dominated traffic threshold and greater than or equal to the uplink dominated traffic threshold the first CBSD determines the traffic type the first CBSD is carrying is balanced downlink and uplink traffic.

Method Embodiment 31. The method of method embodiment 27, wherein the average uplink bit error rate is generated by the first CBSD from bit errors measured in signals or messages transmitted from UEs to the first CBSD during a time interval specified by the first SAS; wherein the average UE power headroom value is generated by averaging power headroom values received by the first CBSD during the time interval specified by the first SAS.

Method Embodiment 32. The method of method embodiment 31 further comprising: determining by the first SAS whether to assign a different spectrum access channel to the first CBSD based on one or more of the following: the received information identifying the type of traffic being carried by the first CBSD, the average uplink bit error rate, and the average UE power headroom value.

Method Embodiment 33. The method of method embodiment 32 further comprising: determining by the first SAS to assign a different frequency spectrum channel to the first CBSD when the determined traffic type is uplink dominated traffic and either the uplink bit error rate is greater than an uplink bit error rate threshold or the average UE power headroom value is greater than an average UE power headroom threshold.

Method Embodiment 34. The method of method embodiment 32 further comprising: determining by the first SAS to assign a different frequency spectrum channel to the first CBSD when the determined traffic type is uplink dominated traffic and both the uplink bit error rate is greater than an uplink bit error rate threshold and the average UE power headroom value is greater than an average UE power headroom threshold.

List of Set of Exemplary Numbered System Embodiments

System Embodiment 1. A communications system including a Spectrum Access System (SAS) located in a Citizens Broadband Radio Service (CBRS) network that allocates frequency spectrum resources to Citizens Broadband Radio Service Devices operating in the CBRS network, the communications system comprising: a Spectrum Access System including: one or more processors that control the operation of the Spectrum Access System (SAS) to perform the following operations: receive a first channel message (e.g., frequency spectrum channel allocation request, a message reporting CBSD traffic type, UE average power headroom or uplink average bit error rate) from a first Citizens Broadband Radio Service Device (CBSD) of the CBRS network; select in response to the received first channel message (e.g., frequency spectrum channel allocation request, a message reporting CBSD traffic type, UE average power headroom or uplink average bit error rate), a first frequency spectrum channel from a plurality of available frequency spectrum channels based on a type of traffic the first Citizens Broadband Radio Service Device is carrying; assign the selected first frequency spectrum channel to the first CBSD for use in wireless communications with user equipment devices; communicate information identifying the assigned first frequency spectrum channel to the first CBSD.

System Embodiment 2. The communications system of system embodiment 1, wherein said first channel message includes one or more of the following: a frequency spectrum channel allocation request, information indicating the type of traffic the first CBSD is carrying, an UE average power headroom value and an uplink average bit error rate.

System Embodiment 3. The communications system of system embodiment 1, wherein the information identifying the assigned first frequency spectrum channel is a channel identifier.

System Embodiment 4. The communications system of system embodiment 1, wherein the selected first frequency spectrum channel is used by the first CBSD for both uplink and downlink communications with user equipment devices being serviced by said first CBSD regardless of traffic type.

System Embodiment 5. The communications system of system embodiment 3, wherein the channel identifier is a numerical value.

System Embodiment 6. The communications system of system embodiment 1, wherein the assigned first frequency spectrum channel is designated as no longer being an available frequency spectrum channel.

System Embodiment 7. The communications system of system embodiment 1, wherein the type of traffic the first CBSD is carrying is one of the following traffic types: downlink dominated traffic type, uplink dominated traffic type, and balanced downlink and uplink traffic type.

System Embodiment 8. The communications system of system embodiment 7, wherein said one or more processors included in the Spectrum Access System further control the Spectrum Access System to perform the following operations: prior to selecting the first frequency spectrum channel determining the type of traffic the first CBSD is carrying based on information provided by the first CBSD to the first Spectrum Access System; and when the determined type of traffic being carried by the first CBSD is said uplink dominated traffic basing said first frequency spectrum channel selection on adjacent channel interference.

System Embodiment 9. The communications system of system embodiment 8, wherein said one or more processors included in the Spectrum Access System further control the Spectrum Access System to perform the following operations: determine a frequency spectrum channel with the least amount of adjacent channel interference from the plurality of available frequency spectrum channels; and wherein said basing said first frequency spectrum channel selection on adjacent channel interference includes selecting the frequency spectrum channel determined to have the least amount of adjacent channel interference as the first frequency spectrum channel.

System Embodiment 10. The communications system of system embodiment 8 wherein the one or more processors included in the Spectrum Access System further control the Spectrum Access System to perform the following operations: when the determined type of traffic being carried by the first CBSD is said downlink dominated traffic basing said first frequency spectrum channel selection on co-channel interference; and determine a frequency spectrum channel with the least amount of co-channel interference from the plurality of available frequency spectrum channels; and wherein said basing said first frequency spectrum channel selection on co-channel interference includes selecting the frequency spectrum channel determined to have the least amount of co-channel interference as the first frequency spectrum channel.

System Embodiment 11. The communications system of system embodiment 10 wherein said one or more processors included in the Spectrum Access System control the System Access System to perform the following operations: when the determined type of traffic being carried by the first CBSD is said balanced downlink and uplink traffic determining said first frequency spectrum channel selection on co-channel interference and adjacent channel interference; and determine frequency spectrum channels with a moderate amount of co-channel interference and a moderate amount of adjacent channel interference from the plurality of available frequency spectrum channels; and wherein said basing said first frequency spectrum channel selection on co-channel interference and adjacent channel interference includes selecting one of the frequency spectrum channels determined to have a moderate amount of co-channel interference and a moderate amount of adjacent channel interference as the first frequency spectrum channel.

System Embodiment 12. The communications system of system embodiment 11, wherein said moderate amount of co-channel interference is a frequency spectrum channel that does not have the least amount of co-channel interference from the plurality of available frequency spectrum channels; and wherein said moderate amount of adjacent channel interference is a frequency spectrum channel that does not have the least amount of adjacent channel interference from the plurality of available frequency spectrum channels.

System Embodiment 13. The communications system of system embodiment 11, wherein said moderate amount of co-channel interference is a frequency spectrum channel that has an amount of co-channel interference above a first co-channel interference level and below a second co-channel interference level; and wherein said moderate amount of adjacent channel interference is a frequency spectrum channel that has an amount of adjacent channel interference above a first adjacent channel interference level and below a second co-channel interference level.

System Embodiment 14. The communications system of system embodiment 13, wherein said moderate amount of co-channel interference is a frequency spectrum channel that does not have the least amount of co-channel interference from the plurality of available frequency spectrum channels; and wherein said moderate amount of adjacent channel interference is a frequency spectrum channel that does not have the least amount of adjacent channel interference from the plurality of available frequency spectrum channels.

System Embodiment 15. The communications system of system embodiment 14, wherein said moderate amount of co-channel interference is a frequency spectrum channel that does not have the most amount of co-channel interference from the plurality of available frequency spectrum channels; and wherein said moderate amount of adjacent channel interference is a frequency spectrum channel that does not have the most amount of adjacent channel interference from the plurality of available frequency spectrum channels.

System Embodiment 16. The communications system of system embodiment 12 wherein said plurality of available frequency spectrum channels are frequency spectrum channels available for allocation to CBSDs but which are not currently assigned to a CBSD.

System Embodiment 17. The communications system of system embodiment 1 wherein said frequency spectrum channel is a block or band of contiguous frequencies.

System Embodiment 18. The communications system of system embodiment 1, wherein said frequency spectrum channel is a block or band of contiguous frequencies.

System Embodiment 19

The communication system of system embodiment 17 wherein said adjacent channel interference is interference caused by wireless transmissions in frequency spectrum channels which are adjacent channels in the frequency spectrum either above or below a selected frequency spectrum channel.

System Embodiment 20. The communications system of system embodiment 19 wherein said co-channel interference is interference caused by unwanted wireless transmissions in the same frequency spectrum channel as the selected frequency spectrum channel when multiple CBSDs are assigned the same frequency spectrum channel.

System Embodiment 21. The communications system of system embodiment 1 wherein prior to receiving said first channel message (e.g., frequency spectrum channel allocation request, a message reporting CBSD traffic type, UE average power headroom or uplink average bit error rate), said one or more processors included in the Spectrum Access System control the Spectrum Access System to perform the following operations: receive a registration request from the first CBSD by the first Spectrum Access System; register the first CBSD at the first Spectrum Access System; in response to the registration of the first CBSD, select an initial frequency spectrum channel assignment for the first CBSD from the plurality of available frequency spectrum channels based on a location of the first CBSD and co-channel interference; assign the selected initial frequency spectrum channel to the first CBSD; communicate information identifying the assigned initial frequency spectrum channel to the first CBSD; communicate a first time interval to the first CBSD, said first time interval defining an amount of time during which the first CBSD is to determine the type of traffic being carried by the first CBSD.

System Embodiment 22. The communications system of system embodiment 21, wherein the first CBSD includes one or more processors that control the first CBSD to perform the following operations: receive from the first SAS in response to registering with the first SAS, said information identifying the initial frequency spectrum channel assigned to the first CBSD and the first time interval; operate the first CBSD to communicate with UEs being serviced by the first CBSD during the first time interval using the initial frequency spectrum channel assigned to the first CBSD; measure during the first time interval the amount of uplink traffic and downlink traffic being carried by the first CBSD; determine whether the traffic type being carried by the first CBSD during the first time interval is downlink dominated traffic, uplink dominated traffic or balanced downlink and uplink traffic based on the measured amount of uplink traffic and downlink traffic being carried by the first CBSD during the first time interval; report or communicate by the first CBSD to the first SAS the determined traffic type for the first time interval.

System Embodiment 23. The communications system of system embodiment 22, wherein the operation of measuring during the first time interval the amount of uplink traffic and downlink traffic being carried by the first CBSD includes: measuring physical resource blocks (PRBs) used for downlink communications from the first CBSD to the UEs being serviced during the first time interval; and measuring physical resource blocks (PRBs) used for uplink communications from the first CBSD to the UEs being serviced during the first time interval.

System Embodiment 24. The communications system of system embodiment 7, wherein the first channel message includes a frequency spectrum channel allocation update request, information indicating the type of traffic being carried by the first CBSD, an UE average power headroom value, an average uplink bit error rate, and a time period over which the information indicating the type of traffic being carried by the first CBSD, the UE average power headroom value, and the average uplink bit error rate where determined; and wherein the first CBSD uses the same frequency spectrum channel for both uplink and downlink communications.

System Embodiment 25. The communications system of system embodiment 7, wherein said first channel message is a request for the assignment of a different frequency spectrum channel to replace the frequency spectrum channel currently assigned to the first CBSD.

System Embodiment 26. The communications system of system embodiment 25, wherein said first channel message includes one or more of the following: information identifying the type of traffic being carried by the first CBSD, an average uplink bit error rate, and an average UE power headroom value.

System Embodiment 27. The communications system of system embodiment 26, wherein the first CBSD determines the type of traffic being carried by the first CBSD by: (i) measuring a number of physical resource blocks (PRBs) used in downlink communications from the first CBSD to the UEs being serviced by the first CBSD, and (ii) measuring the number of physical resource blocks used in uplink communications from the UEs being serviced by the first CBSD to the first CBSD.

System Embodiment 28. The communications system of system embodiment 27, wherein determining the type of traffic being carried by the first CBSD further includes the operations of: generating a traffic percentage from the number of physical resource blocks used in downlink communications and the number of physical resource blocks used in uplink communications; comparing the generated traffic percentage to a first threshold and a second threshold.

System Embodiment 29. The communications system of system embodiment 28, wherein the first threshold is an downlink dominated traffic threshold and the second threshold is an uplink dominated traffic threshold.

System Embodiment 30. The communications system of system embodiment 29, wherein said traffic percentage is a percentage of the number of PRBs used in downlink communications to the combined number of PRBs used in both downlink and uplink communications; wherein when the generated traffic percentage is greater than the downlink dominated traffic threshold the first CBSD determines that the traffic type the first CBSD is carrying is downlink dominated traffic; wherein when the generated traffic percentage is less than the uplink dominated traffic threshold the first CBSD determines the traffic type the first CBSD is carrying is uplink dominated traffic; wherein when the generated traffic percentage is less than or equal to the downlink dominated traffic threshold and greater than or equal to the uplink dominated traffic threshold the first CBSD determines the traffic type the first CBSD is carrying is balanced downlink and uplink traffic.

System Embodiment 31. The communications system of system embodiment 27, wherein the average uplink bit error rate is generated by the first CBSD from bit errors measured in signals or messages transmitted from UEs to the first CBSD during a time interval specified by the first SAS; wherein the average UE power headroom value is generated by averaging power headroom values received by the first CBSD during the time interval specified by the first SAS.

System Embodiment 32. The communications system of system embodiment 31 wherein the one or more processors included in the first SAS control the first SAS to: determine by the first SAS whether to assign a different spectrum access channel to the first CBSD based on one or more of the following: the received information identifying the type of traffic being carried by the first CBSD, the average uplink bit error rate, and the average UE power headroom value.

System Embodiment 33. The communications system of system embodiment 34 wherein the one or more processors including the first SAS control the first SAS to perform the following operations: determine by the first SAS to assign a different frequency spectrum channel to the first CBSD when the determined traffic type is uplink dominated traffic and either the average uplink bit error rate is greater than an uplink bit error rate threshold or the average UE power headroom value is greater than an average UE power headroom threshold.

System Embodiment 34. The communications system of system embodiment 32, wherein the one or more processors included in the first SAS control the first SAS to determine by the first SAS to assign a different frequency spectrum channel to the first CBSD when the determined traffic type is uplink dominated traffic and both the uplink bit error rate is greater than an average uplink bit error rate threshold and the average UE power headroom value is greater than an average UE power headroom threshold.

List of Exemplary Numbered Computer Readable Medium Embodiments

Computer Readable Medium Embodiment 1. A non-transitory computer readable medium including a first set of computer executable instructions which when executed by a processor of a Spectrum Access System (SAS) device cause the SAS device to perform the steps of: receiving a first channel message (e.g., frequency spectrum channel allocation request, a message reporting CBSD traffic type, UE average power headroom or uplink average bit error rate, from a first Citizens Broadband Radio Service Device (CBSD) of a CBRS network; selecting in response to the received first channel message, a first frequency spectrum channel from a plurality of available frequency spectrum channels based on a type of traffic the first Citizens Broadband Radio Service Device is carrying; assigning the selected first frequency spectrum channel to the first CBSD for use in wireless communications with user equipment devices; communicating information identifying the assigned first frequency spectrum channel to the first CBSD.

Computer Readable Medium Embodiment 2. The computer readable medium of computer readable medium embodiment 1, wherein said first channel message includes one or more of the following: a frequency spectrum channel allocation request, information indicating the type of traffic the first CBSD is carrying, an UE average power headroom value and an uplink average bit error rate.

Computer Readable Medium Embodiment 3. The computer readable medium of computer readable medium embodiment 1, wherein the information identifying the assigned first frequency spectrum channel is a channel identifier.

Computer Readable Medium Embodiment 4. The computer readable medium of computer readable medium embodiment 1, wherein the selected first frequency spectrum channel is used by the first CBSD for both uplink and downlink communications with user equipment devices being serviced by said first CBSD regardless of traffic type.

Computer Readable Medium Embodiment 5. The computer readable medium of computer readable medium embodiment 3, wherein the channel identifier is a numerical value.

Computer Readable Medium Embodiment 6. The computer readable medium of computer readable medium embodiment 1, wherein the assigned first frequency spectrum channel is designated as no longer being an available frequency spectrum channel.

Computer Readable Medium Embodiment 7. The computer readable medium of computer readable medium embodiment 1, wherein the type of traffic the first CBSD is carrying is one of the following traffic types: downlink dominated traffic type, uplink dominated traffic type, and balanced downlink and uplink traffic type.

The techniques of various embodiments may be implemented using software, hardware and/or a combination of software and hardware. Various embodiments are directed to apparatus, e.g., CBSD, user equipment devices, SAS, Serving Gateway, PDN gateway, servers, mobility management entities, network nodes, and/or network equipment devices. Various embodiments are also directed to methods, e.g., method of controlling and/or operating CBSD devices, network nodes, SAS, nodes, servers, user equipment devices, controllers, mobility management entities or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments devices, servers, nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as CBSD, UEs, and SAS are configured to perform the steps of the methods described as being performed by the CBSD, UEs, SAS. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., CBSD, UE, SAS, with a processor which includes a component corresponding to each of the steps of the various described methods performed by the device in which the processor is included. In some but not all embodiments a device, e.g., CBSD, UE, SAS, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a CBSD, UE, SAS. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a CBSD, UE or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of allocating frequency spectrum resources in a Citizens Broadband Radio Service (CBRS) network, the method including:
receiving, by a first Spectrum Access System (SAS), a first channel message, from a first Citizens Broadband Radio Service Device (CBSD);
selecting, by the first Spectrum Access System, in response to the received first channel message, a first frequency spectrum channel from a plurality of available frequency spectrum channels based on a type of traffic the first Citizens Broadband Radio Service Device is carrying;
assigning, by the first Spectrum Access System, the selected first frequency spectrum channel to the first CBSD for use in wireless communications with user equipment devices;
communicating, by the first Spectrum Access System, information identifying the assigned first frequency spectrum channel to the first CBSD; and
prior to receiving said first channel message,
receiving a registration request from the first CBSD by the first Spectrum Access System;
registering the first CBSD at the first Spectrum Access System;
in response to the registration of the first CBSD,
selecting, by the first Spectrum Access System, an initial frequency spectrum channel for the first CBSD from the plurality of available frequency spectrum channels based on a location of the first CBSD and co-channel interference;

assigning, by the first Spectrum Access System, the selected initial frequency spectrum channel to the first CBSD;

communicating, by the first Spectrum Access System, information identifying the assigned initial frequency spectrum channel to the first CBSD; and communicating a first time interval to the first CBSD, said first time interval defining an amount of time during which the first CBSD is to determine the type of traffic being carried by the first CBSD.

2. The method of claim 1,
wherein the type of traffic the first CBSD is carrying is one of the following traffic types: downlink dominated traffic type, uplink dominated traffic type, and balanced downlink and uplink traffic type.

3. The method of claim 2 further comprising:
prior to selecting the first frequency spectrum channel determining the type of traffic the first CBSD is carrying based on information provided by the first CBSD to the first Spectrum Access System; and
when the determined type of traffic being carried by the first CBSD is said uplink dominated traffic basing said first frequency spectrum channel selection on adjacent channel interference.

4. The method of claim 3 further comprising:
determining, by the first Spectrum Access System, a frequency spectrum channel with the least amount of adjacent channel interference from the plurality of available frequency spectrum channels; and
wherein said basing said first frequency spectrum channel selection on adjacent channel interference includes selecting the frequency spectrum channel determined to have the least amount of adjacent channel interference as the first frequency spectrum channel.

5. The method of claim 3 further comprising:
when the determined type of traffic being carried by the first CBSD is said downlink dominated traffic basing said first frequency spectrum channel selection on co-channel interference; and
determining, by the first Spectrum Access System, a frequency spectrum channel with the least amount of co-channel interference from the plurality of available frequency spectrum channels; and
wherein said basing said first frequency spectrum channel selection on co-channel interference includes selecting the frequency spectrum channel determined to have the least amount of co-channel interference as the first frequency spectrum channel.

6. The method of claim 2, wherein said first channel message is a request for an assignment of a different frequency spectrum channel to replace the frequency spectrum channel currently assigned to the first CBSD.

7. The method of claim 6, wherein said first channel message includes one or more of the following: information identifying the type of traffic being carried by the first CBSD, an average uplink bit error rate, and an average user equipment (UE) power headroom value.

8. A method of allocating frequency spectrum resources in a Citizens Broadband Radio Service (CBRS) network, the method including:
receiving, by a first Spectrum Access System (SAS), a first channel message, from a first Citizens Broadband Radio Service Device (CBSD);
selecting, by the first Spectrum Access System, in response to the received first channel message, a first frequency spectrum channel from a plurality of available frequency spectrum channels based on a type of traffic the first Citizens Broadband Radio Service Device is carrying;
assigning, by the first Spectrum Access System, the selected first frequency spectrum channel to the first CBSD for use in wireless communications with user equipment devices;
communicating, by the first Spectrum Access System, information identifying the assigned first frequency spectrum channel to the first CBSD;
wherein the type of traffic the first CBSD is carrying is one of the following traffic types: downlink dominated traffic type, uplink dominated traffic type, and balanced downlink and uplink traffic type; and
prior to selecting the first frequency spectrum channel determining the type of traffic the first CBSD is carrying based on information provided by the first CBSD to the first Spectrum Access System; and
when the determined type of traffic being carried by the first CBSD is said uplink dominated traffic basing said first frequency spectrum channel selection on adjacent channel interference;
when the determined type of traffic being carried by the first CBSD is said downlink dominated traffic;
basing said first frequency spectrum channel selection on co-channel interference;
determining, by the first Spectrum Access System, a frequency spectrum channel with the least amount of co-channel interference from the plurality of available frequency spectrum channels; and
wherein said basing said first frequency spectrum channel selection on co-channel interference includes selecting the frequency spectrum channel determined to have the least amount of co-channel interference as the first frequency spectrum channel;
when the determined type of traffic being carried by the first CBSD is said balanced downlink and uplink traffic;
basing said first frequency spectrum channel selection on co-channel interference and adjacent channel interference; and
determining, by the first Spectrum Access System, frequency spectrum channels with a moderate amount of co-channel interference and a moderate amount of adjacent channel interference from the plurality of available frequency spectrum channels; and
wherein said basing said first frequency spectrum channel selection on co-channel interference and adjacent channel interference includes selecting one of the frequency spectrum channels determined to have a moderate amount of co-channel interference and a moderate amount of adjacent channel interference as the first frequency spectrum channel.

9. A method of allocating frequency spectrum resources in a Citizens Broadband Radio Service (CBRS) network, the method including:
receiving, by a first Spectrum Access System (SAS), a first channel message, from a first Citizens Broadband Radio Service Device (CBSD);
selecting, by the first Spectrum Access System, in response to the received first channel message, a first frequency spectrum channel from a plurality of available frequency spectrum channels based on a type of traffic the first Citizens Broadband Radio Service Device is carrying;

assigning, by the first Spectrum Access System, the selected first frequency spectrum channel to the first CBSD for use in wireless communications with user equipment devices;

communicating, by the first Spectrum Access System, information identifying the assigned first frequency spectrum channel to the first CBSD;

wherein the type of traffic the first CBSD is carrying is one of the following traffic types: downlink dominated traffic type, uplink dominated traffic type, and balanced downlink and uplink traffic type;

wherein the first channel message includes a frequency spectrum channel allocation update request, information indicating the type of traffic being carried by the first CBSD, a user equipment (UE) average power headroom value, an average uplink bit error rate, and a time period over which the information indicating: (i) the type of traffic being carried by the first CBSD, (ii) the UE average power headroom value, and (iii) the average uplink bit error rate were determined; and wherein the first CBSD uses the same frequency spectrum channel for both uplink and downlink communications.

10. The method of claim 9 further comprising:
prior to selecting the first frequency spectrum channel determining the type of traffic the first CBSD is carrying based on information provided by the first CBSD to the first Spectrum Access System; and
when the determined type of traffic being carried by the first CBSD is said uplink dominated traffic basing said first frequency spectrum channel selection on adjacent channel interference.

11. A communications system including a Spectrum Access System (SAS) located in a Citizens Broadband Radio Service (CBRS) network that allocates frequency spectrum resources to Citizens Broadband Radio Service Devices operating in the CBRS network, the communications system comprising:
said Spectrum Access System including:
one or more processors that control the operation of the Spectrum Access System (SAS) to perform the following operations;
receive a first channel message from a first Citizens Broadband Radio Service Device (CBSD) of the CBRS network;
select in response to the received first channel message, a first frequency spectrum channel from a plurality of available frequency spectrum channels based on a type of traffic the first Citizens Broadband Radio Service Device is carrying;
assign the selected first frequency spectrum channel to the first CBSD for use in wireless communications with user equipment devices;
communicate information identifying the assigned first frequency spectrum channel to the first CBSD;
wherein the type of traffic the first CBSD is carrying is one of the following traffic types: downlink dominated traffic type, uplink dominated traffic type, and balanced downlink and uplink traffic type;
wherein the first channel message includes a frequency spectrum channel allocation update request, information indicating the type of traffic being carried by the first CBSD, a user equipment (UE) average power headroom value, an average uplink bit error rate, and a time period over which the information indicating: (i) the type of traffic being carried by the first CBSD, (ii) the UE average power headroom value, and (iii) the average uplink bit error rate were determined; and wherein the first CBSD uses the same frequency spectrum channel for both uplink and downlink communications.

12. A communications system including a Spectrum Access System (SAS) located in a Citizens Broadband Radio Service (CBRS) network that allocates frequency spectrum resources to Citizens Broadband Radio Service Devices operating in the CBRS network, the communications system comprising:
the Spectrum Access System including:
one or more processors that control the operation of the Spectrum Access System (SAS) to perform the following operations:
receive a first channel message from a first Citizens Broadband Radio Service Device (CBSD) of the CBRS network;
select in response to the received first channel message, a first frequency spectrum channel from a plurality of available frequency spectrum channels based on a type of traffic the first Citizens Broadband Radio Service Device is carrying;
assign the selected first frequency spectrum channel to the first CBSD for use in wireless communications with user equipment devices;
communicate information identifying the assigned first frequency spectrum channel to the first CBSD; and
wherein prior to receiving said first channel message, said one or more processors included in the Spectrum Access System control the Spectrum Access System to perform the following operations:
receive a registration request from the first CBSD by the Spectrum Access System;
register the first CBSD at the Spectrum Access System; and
in response to the registration of the first CBSD,
select an initial frequency spectrum channel assignment for the first CBSD from the plurality of available frequency spectrum channels based on a location of the first CBSD and co-channel interference;
assign the selected initial frequency spectrum channel to the first CBSD;
communicate information identifying the assigned initial frequency spectrum channel to the first CBSD; and
communicate a first time interval to the first CBSD, said first time interval defining an amount of time during which the first CBSD is to determine the type of traffic being carried by the first CBSD.

13. The communications system of claim 12,
wherein the type of traffic the first CBSD is carrying is one of the following traffic types: downlink dominated traffic type, uplink dominated traffic type, and balanced downlink and uplink traffic type.

14. The communications of claim 13 wherein said one or more processors included in the Spectrum Access System further control the Spectrum Access System to perform the following operations:
prior to selecting the first frequency spectrum channel determining the type of traffic the first CBSD is carrying based on information provided by the first CBSD to the Spectrum Access System; and
when the determined type of traffic being carried by the first CBSD is said uplink dominated traffic basing said first frequency spectrum channel selection on adjacent channel interference.

15. The communications system of claim 14 wherein said one or more processors included in the Spectrum Access System further control the Spectrum Access System to perform the following operations:
- determine a frequency spectrum channel with the least amount of adjacent channel interference from the plurality of available frequency spectrum channels; and
- wherein said basing said first frequency spectrum channel selection on adjacent channel interference includes selecting the frequency spectrum channel determined to have the least amount of adjacent channel interference as the first frequency spectrum channel.

16. The communications system of claim 14 wherein the one or more processors included in the Spectrum Access System further control the Spectrum Access System to perform the following operations:
- when the determined type of traffic being carried by the first CBSD is said downlink dominated traffic basing said first frequency spectrum channel selection on co-channel interference; and
- determine a frequency spectrum channel with the least amount of co-channel interference from the plurality of available frequency spectrum channels; and
- wherein said basing said first frequency spectrum channel selection on co-channel interference includes selecting the frequency spectrum channel determined to have the least amount of co-channel interference as the first frequency spectrum channel.

17. The communications system of claim 13, wherein said first channel message is a request for the assignment of a different frequency spectrum channel to replace the frequency spectrum channel currently assigned to the first CBSD.

18. A communications system including a Spectrum Access System (SAS) located in a Citizens Broadband Radio Service (CBRS) network that allocates frequency spectrum resources to Citizens Broadband Radio Service Devices operating in the CBRS network, the communications system comprising:
- the Spectrum Access System including:
  - one or more processors that control the operation of the Spectrum Access System (SAS) to perform the following operations;
  - receive a first channel message from a first Citizens Broadband Radio Service Device (CBSD) of the CBRS network;
  - select in response to the received first channel message, a first frequency spectrum channel from a plurality of available frequency spectrum channels based on a type of traffic the first Citizens Broadband Radio Service Device is carrying;
  - assign the selected first frequency spectrum channel to the first CBSD for use in wireless communications with user equipment devices;
  - communicate information identifying the assigned first frequency spectrum channel to the first CBSD;
  - wherein the type of traffic the first CBSD is carrying is one of the following traffic types: downlink dominated traffic type, uplink dominated traffic type, and balanced downlink and uplink traffic type; and
  - wherein said one or more processors included in the Spectrum Access System further control the Spectrum Access System to perform the following operations;
    - prior to selecting the first frequency spectrum channel determining the type of traffic the first CBSD is carrying based on information provided by the first CBSD to the Spectrum Access System; and
    - when the determined type of traffic being carried by the first CBSD is said uplink dominated traffic basing said first frequency spectrum channel selection on adjacent channel interference;
    - when the determined type of traffic being carried by the first CBSD is said downlink dominated traffic; basing said first frequency spectrum channel selection on co-channel interference; and
      - determining a frequency spectrum channel with the least amount of co-channel interference from the plurality of available frequency spectrum channels; and
      - wherein said basing said first frequency spectrum channel selection on co-channel interference includes selecting the frequency spectrum channel determined to have the least amount of co-channel interference as the first frequency spectrum channel;
    - when the determined type of traffic being carried by the first CBSD is said balanced downlink and uplink traffic:
      - basing said first frequency spectrum channel selection on co-channel interference and adjacent channel interference; and
      - determining frequency spectrum channels with a moderate amount of co-channel interference and a moderate amount of adjacent channel interference from the plurality of available frequency spectrum channels; and
      - wherein said basing said first frequency spectrum channel selection on co-channel interference and adjacent channel interference includes selecting one of the frequency spectrum channels determined to have a moderate amount of co-channel interference and a moderate amount of adjacent channel interference as the first frequency spectrum channel.

19. The communications system of claim 11, wherein said one or more processors included in the Spectrum Access System further control the Spectrum Access System to perform the following operations:
- prior to selecting the first frequency spectrum channel determining the type of traffic the first CBSD is carrying based on information provided by the first CBSD to the Spectrum Access System; and
- when the determined type of traffic being carried by the first CBSD is said uplink dominated traffic basing said first frequency spectrum channel selection on adjacent channel interference.

20. A non-transitory computer readable medium including a first set of computer executable instructions which when executed by a processor of a Spectrum Access System (SAS) device cause the SAS device to perform the steps of:
- receiving a first channel message from a first Citizens Broadband Radio Service Device (CBSD) of a Citizens Broadband Radio Service (CBRS) network;
- selecting in response to the received first channel message, a first frequency spectrum channel from a plurality of available frequency spectrum channels based on a type of traffic the first Citizens Broadband Radio Service Device is carrying;
- assigning the selected first frequency spectrum channel to the first CBSD for use in wireless communications with user equipment devices;

communicating information identifying the assigned first frequency spectrum channel to the first CBSD; and wherein prior to receiving said first channel message, said first set of computer executable instructions which when executed by the processor of the Spectrum Access System (SAS) device cause the SAS device to perform the steps of:

receiving a registration request from the first CBSD by the Spectrum Access System;

registering the first CBSD at the Spectrum Access System;

in response to the registration of the first CBSD,
- selecting an initial frequency spectrum channel assignment for the first CBSD from the plurality of available frequency spectrum channels based on a location of the first CBSD and co-channel interference;
- assigning the selected initial frequency spectrum channel to the first CBSD;
- communicating information identifying the assigned initial frequency spectrum channel to the first CBSD; and
- communicating a first time interval to the first CBSD, said first time interval defining an amount of time during which the first CBSD is to determine the type of traffic being carried by the first CBSD.

* * * * *